United States Patent
Dorn et al.

(10) Patent No.: US 12,311,262 B2
(45) Date of Patent: May 27, 2025

(54) SYSTEMS AND METHODS FOR ENABLING PREDICTIVE ASSISTANCE DURING GAMEPLAY

(71) Applicants: Sony Interactive Entertainment LLC, San Mateo, CA (US); Sony Interactive Entertainment Inc., Tokyo (JP)

(72) Inventors: Victoria Dorn, San Mateo, CA (US); Sarah Karp, Foster City, CA (US); Sepideh Karimi, Novato, CA (US); Celeste Bean, San Francisco, CA (US); Liz Juenger, San Francisco, CA (US)

(73) Assignees: SONY INTERACTIVE ENTERTAINMENT LLC, San Mateo, CA (US); SONY INTERACTIVE ENTERTAINMENT INC., Tokyo (JP)

( * ) Notice: Subject to any disclaimer, the term of this patent is extended or adjusted under 35 U.S.C. 154(b) by 348 days.

(21) Appl. No.: 17/827,603

(22) Filed: May 27, 2022

(65) Prior Publication Data
US 2023/0405461 A1    Dec. 21, 2023

(51) Int. Cl.
*A63F 13/533* (2014.01)
*A63F 13/798* (2014.01)
(Continued)

(52) U.S. Cl.
CPC .......... *A63F 13/533* (2014.09); *A63F 13/798* (2014.09); *A63F 13/837* (2014.09); *A63F 13/92* (2014.09); *G06N 3/08* (2013.01)

(58) Field of Classification Search
CPC .. A63F 13/422; A63F 13/533; A63F 13/5375; A63F 13/67; A63F 13/69;
(Continued)

(56) References Cited

U.S. PATENT DOCUMENTS 6,663,492 B2 * 12/2003 Thompson .............. A63F 13/45
463/43
10,195,531 B2 * 2/2019 Osman .................. A63F 13/795
(Continued)

FOREIGN PATENT DOCUMENTS

JP    2008220782 A    9/2008
JP    2018512907 A    5/2018
(Continued)

OTHER PUBLICATIONS

PCT/US2023/022609 Notification of Transmittal of the International Search Report and the Written Opinion of the International Searching Authority, or the Declaration, PCT/ISA/220, and the International Search Report, PCT/ISA/210, Sep. 25, 2023.

*Primary Examiner* — Milap Shah
(74) *Attorney, Agent, or Firm* — Kilpatrick Townsend & Stockton LLP

(57) ABSTRACT

A method for providing assistance during gameplay is described. The method includes accessing a profile model associated with a user account of a user. The profile model is used to generate one or more predictive indicators based on a plurality of game contexts of one or more games. The method further includes receiving a request for accessing a game for a game session via the user account and generating assistance input for the user responsive to the one or more predictive indicators that the user will be unable to complete a task in the game. The task is associated to a game context. The assistance input is provided before the user performs the task.

20 Claims, 6 Drawing Sheets

(Assistance Input Data)

(51) Int. Cl.
*A63F 13/837* (2014.01)
*A63F 13/92* (2014.01)
*G06N 3/08* (2023.01)

(58) Field of Classification Search
CPC ...... A63F 13/79; A63F 13/798; A63F 13/387; A63F 13/92
See application file for complete search history.

(56) References Cited

U.S. PATENT DOCUMENTS

| | | | | |
|---|---|---|---|---|
| 11,229,844 | B2* | 1/2022 | Benedetto | A63F 13/79 |
| 11,325,048 | B2* | 5/2022 | Yannakakis | G06N 3/045 |
| 11,331,581 | B2* | 5/2022 | Pedersen | G06N 20/10 |
| 11,358,062 | B2* | 6/2022 | Pichaimurthy | A63F 13/533 |
| 11,596,867 | B2* | 3/2023 | Snodgrass | A63F 13/56 |
| 2005/0246638 | A1* | 11/2005 | Whitten | A63F 13/10 |
| | | | | 715/708 |
| 2009/0094535 | A1* | 4/2009 | Bromenshenkel | A63F 13/67 |
| | | | | 715/757 |
| 2010/0045660 | A1* | 2/2010 | Dettinger | G06Q 90/00 |
| | | | | 345/419 |
| 2013/0316779 | A1* | 11/2013 | Vogel | G06Q 10/06375 |
| | | | | 463/16 |
| 2016/0247110 | A1* | 8/2016 | Sinha | G06Q 10/06316 |
| 2017/0282063 | A1* | 10/2017 | Krishnamurthy | A63F 13/69 |
| 2018/0001205 | A1 | 1/2018 | Osman et al. | |
| 2018/0001206 | A1 | 1/2018 | Osman et al. | |
| 2019/0168122 | A1 | 6/2019 | Osman et al. | |
| 2019/0168123 | A1* | 6/2019 | Webster | A63F 13/795 |
| 2019/0358545 | A1* | 11/2019 | Aghdaie | A63F 13/67 |
| 2021/0073523 | A1* | 3/2021 | Reynolds | G06T 7/97 |
| 2021/0106918 | A1 | 4/2021 | Osman et al. | |
| 2021/0106919 | A1 | 4/2021 | Osman et al. | |
| 2021/0312301 | A1* | 10/2021 | Azmandian | A63F 13/79 |
| 2021/0394073 | A1* | 12/2021 | Osman | A63F 13/87 |
| 2021/0402292 | A1 | 12/2021 | Chow | |
| 2023/0087133 | A1* | 3/2023 | Karri | G06N 20/00 |
| | | | | 706/12 |
| 2023/0342831 | A1* | 10/2023 | Nath | G06Q 30/0631 |
| 2024/0058700 | A1* | 2/2024 | Juenger | A63F 13/79 |
| 2024/0100440 | A1* | 3/2024 | Azmandian | A63F 13/67 |

FOREIGN PATENT DOCUMENTS

| | | |
|---|---|---|
| JP | 2019520154 A | 7/2019 |
| JP | 2019524212 A | 9/2019 |

\* cited by examiner

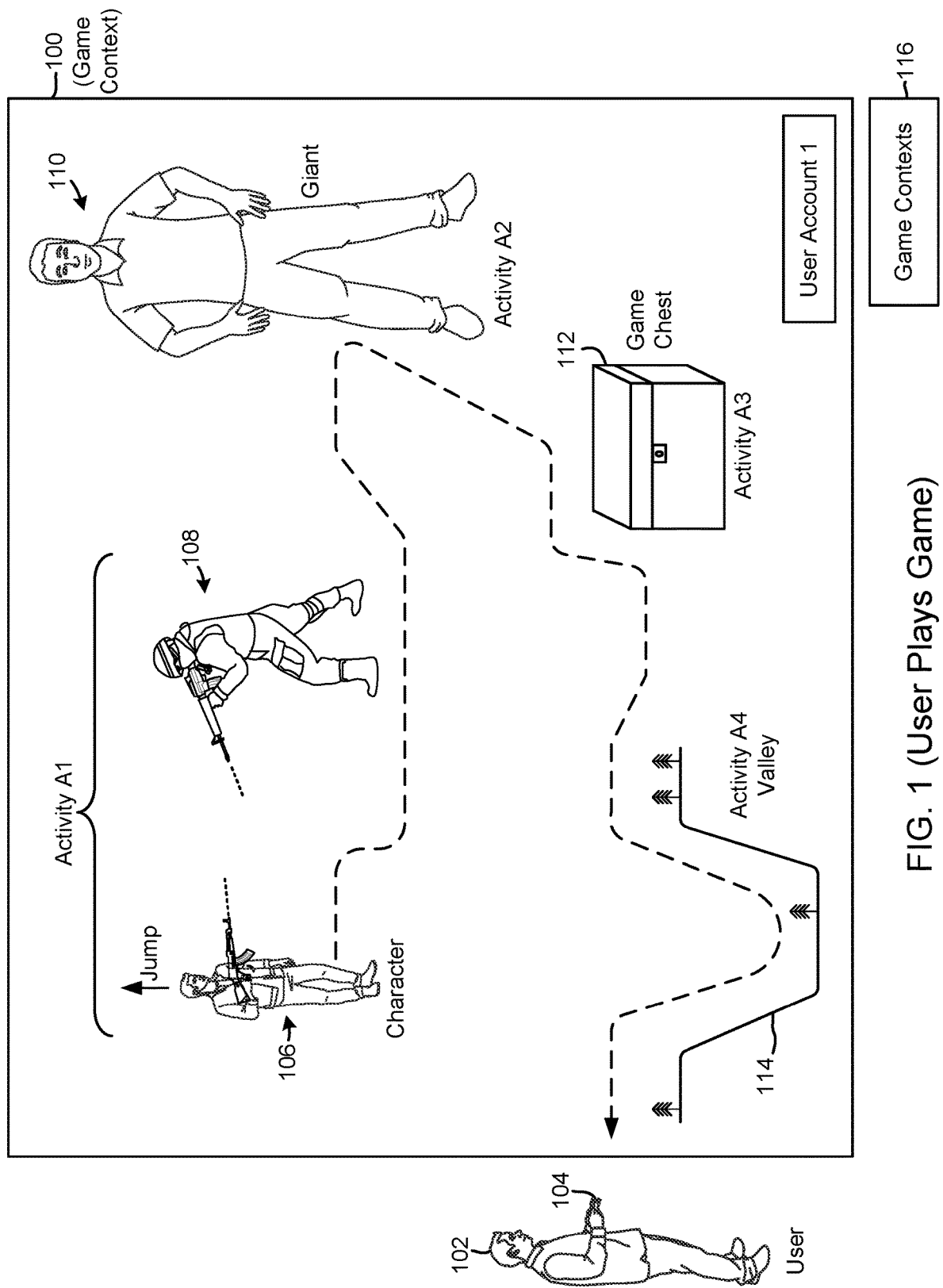
FIG. 1 (User Plays Game)

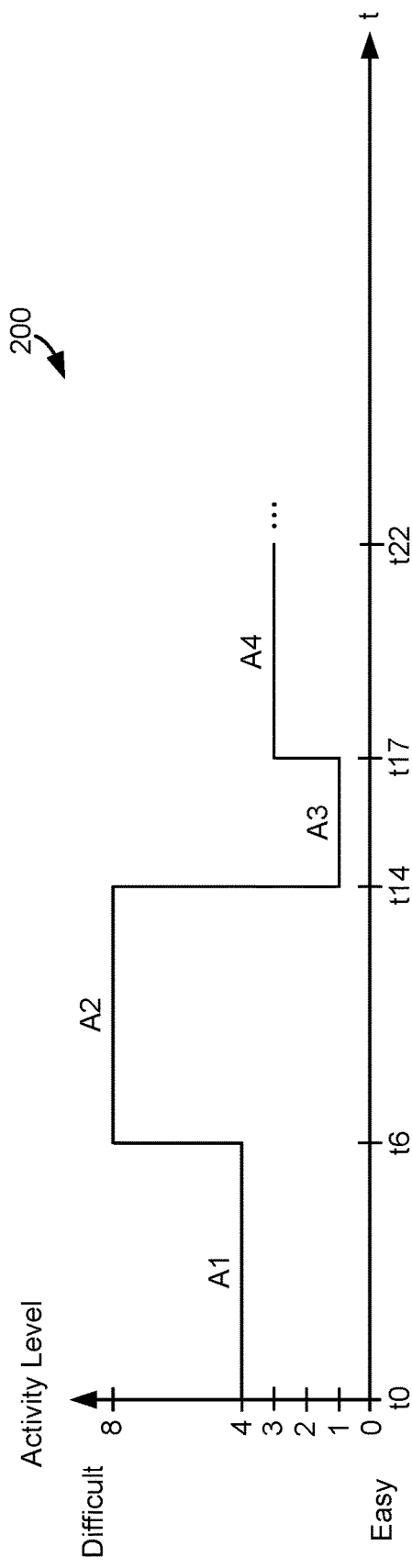
FIG. 2 (Performance Level For Each Activity)
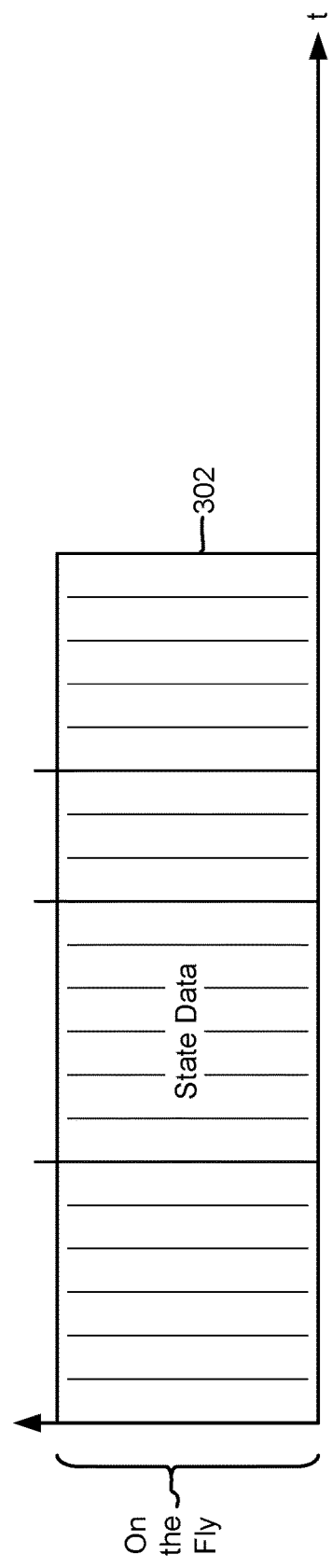
FIG. 3 (State Data Collected For All Activities)

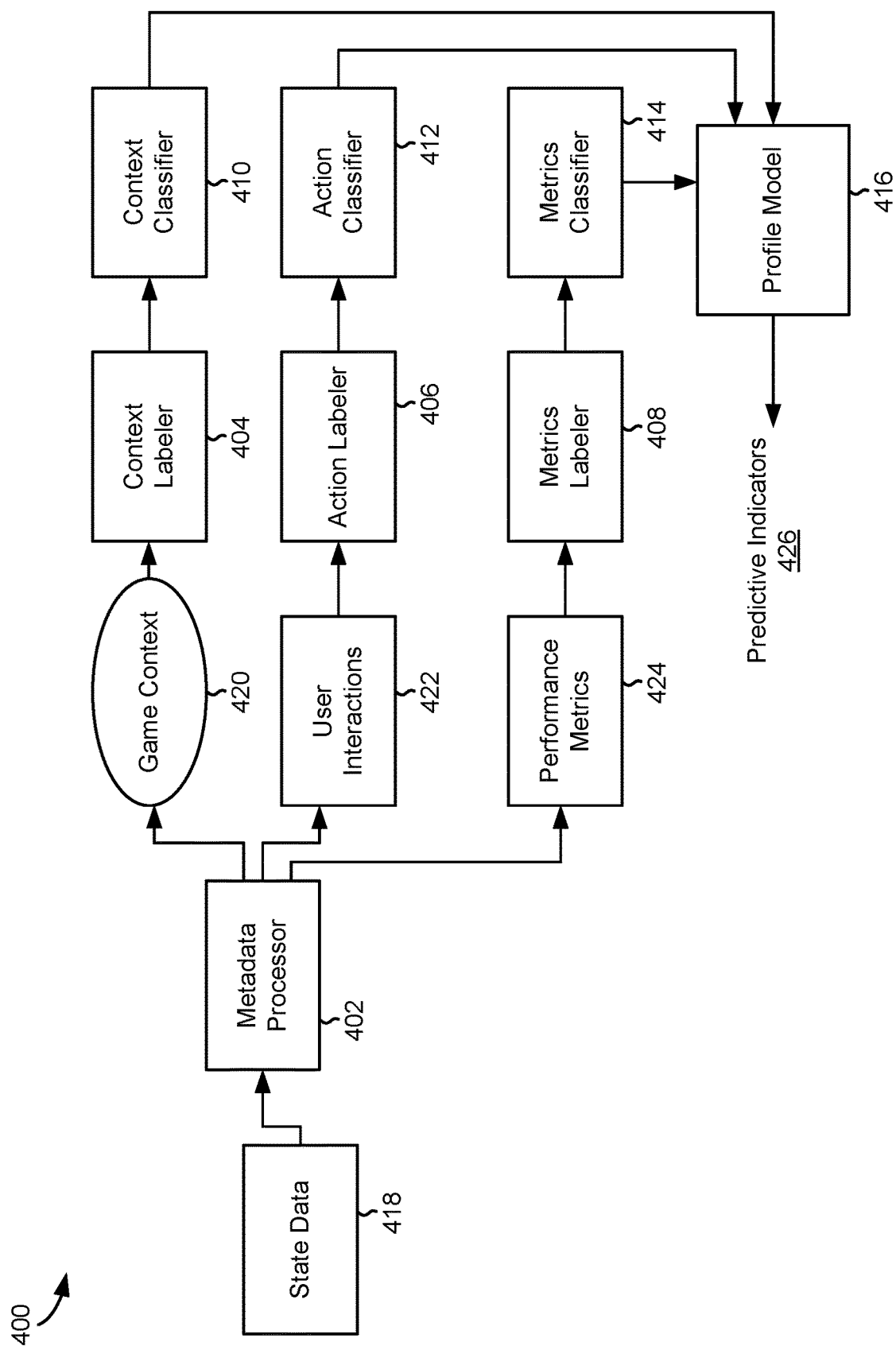
FIG. 4 (Method for Generating Predictive Indicators)

(Generation of Assistance Input Data for An Activity)

(Assistance Input Data)

SYSTEMS AND METHODS FOR ENABLING PREDICTIVE ASSISTANCE DURING GAMEPLAY

FIELD

The present disclosure relates to systems and methods for enabling predictive assistance during gameplay.

BACKGROUND

Conventional games occasionally provide co-operative multi-player modes in which players assist each other to complete a task with their respective in-game avatars, which are virtual representations within a game environment. In the multi-player modes, typically two separate players to work together to achieve a goal.

By contrast, in single-player game modes, the purpose of the game is to provide a challenge to an individual player within a game world, and it is up to this player to achieve in-game goals themselves. However, on occasion, the single or multi-player game provides a challenge that utilizes more skill than the player possesses.

Conventionally, to accommodate the challenge provided by single or multi-player game, some players recount their own progress through the game, either as a text document or as a series of videos. However, these solutions may be unsatisfactory, particularly if the player cannot overcome a particular challenge.

It is in this context that embodiments of the invention arise.

SUMMARY

Embodiments of the present disclosure provide systems and methods for enabling predictive assistance during gameplay.

In one embodiment, a method for processing user's gameplay over a period of time to learn the user's tendencies, skill level, input accuracy, and general ability is described. The gameplay can be processed by ingesting gameplay history of the user, such as a player, for one or more games. The gameplay history can include game state data for each of the one or more games, which identify the context of the game at different instances and reactions by the user to the specific game context. Over time, different types of inputs and the game contexts can be classified to build a profile model that is descriptive of the user's game tendencies and potential weaknesses. Using the profile model, during a current gameplay, one or more processors, such as an artificial intelligence processor, can predict where the user is intending to navigate or achieve in a specific context. If the user is attempting a game input or a combination of inputs for a specific context in which the player is weakened, the one or more processors can provide assistance to the user in the form of suggestions for button inputs or tactics for the specific context.

In some embodiments, the user who continuously fails to provide a correct input to a specific game control, can be provided assistance by the one or more processors that will automatically press the button for the user. This button press for the user is done based on a predicted intention of the user for the specific game context. The predicted intention is determined by the one or more processors.

In several embodiments, the one or more processors can perform more than one button press or combinations of button presses for the user if the user is anticipating trouble or inability to complete a specific level, combination of inputs, or achieve a result after some frustration or failure.

In an embodiment, the predictive assistance can be provided automatically by the one or more processors when an assistance mode is activated by the user. When the user knows the assistance mode is activated, the one or more processors can apply one or more inputs for the user, based on the user's predicted intention or weakness in performing a specific task.

In one embodiment, the assistance mode can be a form of autopilot for the user to allow the game system to complete one or more game tasks, sequences, a level, or achieve a result that is difficult for the user. Once the user feels comfortable resuming control, the assistance mode can be deactivated.

In an embodiment, the one or more processors learn a game style of the user and use it to press a button for the user based on predicted intention. For example, the one or more processors execute one or more tests, such as, notify the user to achieve a task in the game quickly, jump over a virtual object, etc., to determine the game style of the user. In the example, the one or more processors save the game style in a user profile to build the profile model and use the game style for calibrating the game for the user.

In one embodiment, a method includes determining a mood or intensity of the user, such as mood, feeling chill or intense, etc., and adjusting a mode of gameplay. For example, the mode is adjusted to being an easy mode or a hard mode based on the mood or intensity expressed by the user.

In an embodiment, the method includes controlling lighting up of buttons and haptic feedback for training the user.

In one embodiment, for a new or a novice user, the assistance mode can be an easy mode, for a medium skilled user, the assistance mode can be a medium mode, and for an experienced user, the assistance mode can be a hard mode.

In an embodiment, a method for providing assistance during gameplay is described. The method includes accessing a profile model associated with a user account of a user. The profile model is used to generate one or more predictive indicators based on a plurality of game contexts of one or more games. The method further includes receiving a request for accessing a game for a game session via the user account and generating assistance input for the user responsive to the one or more predictive indicators that the user will be unable to complete a task in the game. The task is associated to a game context. The assistance input is provided before the user performs the task.

In one embodiment, a computer system for providing assistance during gameplay is described. The computer system includes a processor. The processor accesses a profile model associated with a user account of a user. The profile model is used to generate one or more predictive indicators based on a plurality of game contexts of one or more games. The processor receives a request for accessing a game for a game session via the user account and generates assistance input for the user responsive to the one or more predictive indicators that the user will be unable to complete a task in the game. The task is associated to a game context. The processor provides the assistance input before the user performs the task. The computer system includes a memory device coupled to the processor.

In an embodiment, a system for providing assistance during gameplay is described. The system includes a client device and a server coupled to the client device via a computer network. The server accesses access a profile model associated with a user account of a user. The profile model is used to generate one or more predictive indicators based on a plurality of game contexts of one or more games. The server receives a request for accessing a game for a game session via the user account. The server generates assistance input for the user responsive to the one or more predictive indicators that the user will be unable to complete a task in the game. The task is associated to a game context. The server sends the assistance input before the user performs the task. The client device receives the assistance input from the server via the computer network.

Some advantages of the herein described systems and methods include providing the predictive assistance to the user during a play of a game. By providing the predictive assistance, network traffic efficiency and server efficiency are increased. The user, when provided with the predictive assistance, interacts with the game to advance in the game. Without the predictive assistance, the user does not advance in the game and keeps operating a controller in an incorrect manner. When the controller is operated in the incorrect manner, incorrect inputs are generated. The incorrect inputs are then sent to a server, and that increases network traffic between the server and the controller. It also increases a load of the server. By providing the predictive assistance to the user, chances of generation of the incorrect inputs are reduced, and therefore server efficiency is increased. Also, chances of network traffic congestion are reduced. When the chances of network traffic congestion, the network efficiency is increased.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1 is a diagram of an embodiment of a game context to illustrate multiple activities presented to a user to enable a play of a game by the user.

FIG. 2 is a graph to illustrate an activity level during each of the activities performed by the user and time taken by the user in finishing the activity.

FIG. 3 is a graph to illustrate a collection of state data by one or more processors of a game system when the user engages in the activities within the game context.

FIG. 4 is a diagram of an embodiment of a system to illustrate generation of predictive indicators based on the state data determined from engagement of the user with multiple game contexts.

DETAILED DESCRIPTION

Figure 5:
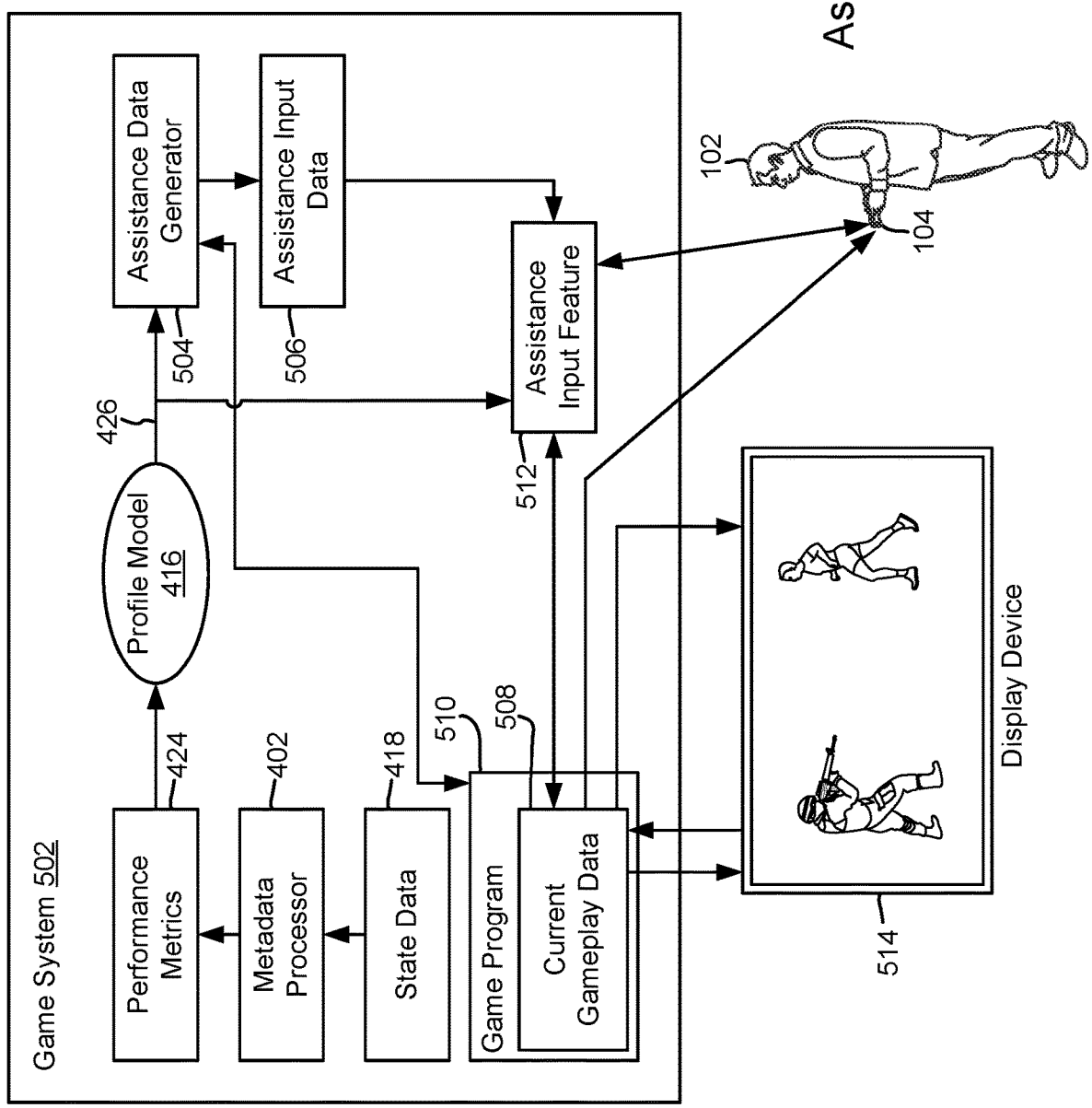
FIG. 5 is a diagram of an embodiment of system to illustrate use of the game system and a hand-held controller (HHC) to provide assistance input data to the user via the HHC based on the predictive indicators.

Systems and methods for enabling predictive assistance during gameplay are described. It should be noted that various embodiments of the present disclosure are practiced without some or all of these specific details. In other instances, well known process operations have not been described in detail in order not to unnecessarily obscure various embodiments of the present disclosure.

FIG. 1 is a diagram of an embodiment of a game context 100 to illustrate multiple activities A1, A2, A3, and A4 presented to a user 102 to enable a play of a game by the user 102. An example of a game context, as described herein, is one or more virtual scenes, such as a virtual reality (VR) scene, having one or more activities. To illustrate, the game context 100 is a virtual scene including multiple virtual objects, such as a virtual character 106, another virtual character 108, a virtual giant 110, a virtual game chest 112, and a virtual valley 114, and positions and orientations of each of the virtual objects with respect to each other within the virtual scene. In the illustration, each virtual object is identified by a shape, size, and color of the virtual object.

The user 102 uses a hand-held controller (HHC) 104 to play the game. The HHC 104 is an example of a game controller. The user 102 logs into a user account 1, which is assigned to the user 102, by using the HHC 104 and accesses a game session of the game from a game system, such as a cloud system or a computing device, via the user account 1. As an example, the game system includes one or more processors and one or more memory devices. The one or more processors are coupled to the one or more memory devices. An example of a processor includes an application specific integrated circuit (ASIC), a programmable logic device (PLD), a microcontroller, or a microprocessor. An example of a memory device includes a read-only memory (ROM) or a random access memory device (RAM) or a combination thereof. To illustrate, the memory device is a Flash memory or a hard disk or a redundant array of independent disks (RAID). Examples of the computing device include a desktop computer, a laptop computer, a smart television, a tablet, a head-mounted display (HMD), a game console, and a smartphone. An example of the cloud system includes one or more servers.

It should be noted that the HHC 104 and/or the computing device are examples of a client device, and the cloud system is an example of a server system. The client device is coupled to the server system via a computer network, such as the Internet, an Intranet, or a combination thereof.

The game session is accessed when a game program, such as a game code, is executed by the one or more processors of the game system. Once the game session is accessed, the game context 100 is displayed on a display device of the client device. During the game session, the user 102 encounters multiple activities, such as the activities A1 through A4, within the game context 100. For example, the user 102 uses the HHC 104 to control the virtual character 106 to fight with the virtual character 108. In the example, the fight between the virtual characters 106 and 108 is an illustration of the activity A1 within the game context 100. Further, in the example, the user 102 then uses the HHC 104 to control the virtual character 106 to fight with the virtual giant 110. In the example, the fight with the virtual giant 110 is an illustration of the activity A2. Also, in the example, after engaging in the activity A2, e.g., after the virtual character 106 is controlled by the user 102 via the HHC 104 to fight with and survive against the virtual giant 110, the virtual character 106 comes across a virtual game chest 112. In the example, the user 102 controls the HHC 104 to open the virtual game chest 112 to obtain virtual items, such as virtual guns or virtual ammunition, from the virtual game chest 112. In the example, the opening by the the virtual character 106 of the virtual game chest 112 and retrieving of the virtual items from the virtual game chest 112 is an illustration of the activity A3. Further, in the example, after the activity A3, the user 102 controls the virtual character 106 via the HHC 104 to cross a virtual valley 114. In the example, the movement of the virtual character 106 to cross the virtual valley 114 is an example of the activity A4. In the example, game context data for generating the game context 100 is generated by the one or more processors of the game system for display on the display device of the client device. At an end of the game session, the user 102 uses the HHC 104 to log out of the user account 1. The logging out of the user account 1 ends the game session.

In a similar manner, the user 104 accesses additional game sessions of the game or other games via the user account 1. When the user 102 accesses the additional game sessions, the one or more processors of the game system create game contexts 116 and the user 102 engages with multiple activities provided by the game contexts 116 in each of the additional game sessions. As an example, one or more of the game contexts 116 are of the same game as that of the game having the game context 100. To illustrate, the game context 100 is of a game having a game title Fortnite™ and one or more of the game contexts 116 are of the same game having the game title Fortnite™. As another example, one or more of the game contexts 116 are of a different game than the game having the game context 100. To illustrate, the game context 100 is of a game having the game title Fortnite™ and one or more the game contexts 116 are of a different game having a game title Apex Legends™. It should be noted that each of the additional game sessions are accessed by the user 102 after logging into the user account 1 and each of the additional game sessions ends after the user 102 logs out of the user account 1.

In an embodiment, a game session ends when a final outcome is achieved by the user 102 in the game session.

In one embodiment, a game session of a game ends when the game ends or is controlled by the user 102 to end. After the game ends, a game session of the same game or another game is accessed from the one or more processors of the game system for gameplay by the user 102.

In one embodiment, one or more virtual scenes include one or more augmented reality (AR) scenes.

In an embodiment, the user 102 uses multiple hand-held controllers, instead of the HHC 104 to play the game. For example, the user 102 holds a first hand-held controller in his/her left hand and a second hand-held controller in his/her right hand to play the game. Each of the hand-held controllers is sometimes referred to herein as a game controller.

In one embodiment, a game context includes any other number of activities. For example, the game context includes a single activity, or two activities, or ten activities.

In one embodiment, instead of the HHC 104, the HMD is used as a controller.

In an embodiment, in addition to the HHC 104, the HMD is used as a controller. In the embodiment, the HHC 104 and the HMD are referred to herein as controllers.

FIG. 2 is a graph 200 to illustrate an activity level, such as a difficulty level, during each of the activities A1 through A4 and time t taken by the user 102 in completing the activity. The graph 200 plots the activity level on a y-axis and the time t on an x-axis. The time t ranges from a time t0 to a time t22. It should be noted that a time period between any two consecutive ones of the times t0 through t22 is equal. For example, a time period between the times t0 and t1 is equal to a time period between the times t1 and t2. The activity levels range from 0 to 8 and increase from 0 to 8, with 0 being an easy activity level and 8 being a difficult or hard activity level, and the activity levels from 1 through 7 range in between the easy and difficult levels. The activity levels are assigned by the game program executed by the one or more processors of the game system.

As indicated in the graph 200, the one or more processors of the game system assign the activity level 4 to the activity A1 and determine that the user 102 (FIG. 1) takes a first time period from the time t0 to the time t6 to finish the activity A1. For example, the one or more processors of the game system include or access a clock source, and based on a clock signal generated by the clock source, determine that the first time period is taken by the user 102 via the user account 1 to fight and survive against the virtual character 108 (FIG. 1). In a similar manner, the one or more processors of the game system assign the activity level 8 to the activity A2 and determine that the user 102 takes a time period from the time t6 to the time t24 to finish the activity A2, assigns the activity level 1 to the activity A3 and determine that the user 102 takes a time period from the time t14 to the time t17 to finish the activity A3, and assigns the activity level 3 to the activity A4 and determines that the user 102 takes a time period from the time t17 to the time t22 to finish the activity A4. For example, the one or more processors of the game system determine, based on the clock signal, that a second time period is taken by the user 102 via the user account 1 to fight the virtual giant 110 (FIG. 1). In the example, the second time period is time taken by the virtual character 106 (FIG. 1) to fight and survive against the virtual giant 110. In the example, the one or more processors of the game system further determine that the second time period is greater than the first time period. In a similar manner, the one or more processors of the game system determine activity levels for activities completed by the user 102 during the game contexts 116 (FIG. 1).

FIG. 3 is a graph 300 to illustrate a collection of state data 302 by the one or more processors of the game system when the user 102 (FIG. 1) engages in the activities A1 through A4 within the game context 100. Examples of state data are provided below. The one or more processors of the game system collect the state data 302 during each of the activities A1 through A4. For example, as the user 102 engages in the activities A1 through A4, the one or more processors of the game system obtains, such as determines, identifies, or accesses the state data 302, and stores the state data 302 in the one or more memory devices of the game system.

It should be noted that the state data 302 is obtained and stored on-the-fly. For example, immediately after the virtual character 106 finishes fighting and surviving against the virtual character 108 (FIG. 1), the one or more processors of the game system determine that the virtual character 106 has finished fighting the virtual character 108 based on a position and orientation the virtual character 106 with reference to a position and orientation of the virtual character 108, and identifies a number of virtual accomplishments, such as a number of virtual points or a number of virtual kills or a combination thereof, assigned to the user account 1 as soon as the position and orientation of the virtual character 106 with reference to the position and orientation of the virtual character 108 is achieved. In the example, the position of the virtual character 108 is a horizontal position, such as in a dead position or in a position lying flat on a virtual ground, in the game context 100 (FIG. 1). Further, in the example, the position of the virtual character 106 is a vertical position, such as a standing position. Moreover, in the example, the one or more processors of the game system identify the activity level as 4 of the activity A1 and calculate the first time period. In the example, the position and orientation of the virtual character 106, the position and orientation of the virtual character 108, the number of virtual accomplishments, the activity level, and the first time period are examples of the state data 302, and the one or more processors store the number of virtual accomplishments, the activity level, and the first time period in the one or more memory devices of the game system. Further, in the example, the one or more processors of the game system identify a skill level assigned within the user account 1 to the user 102 while engaging with the activities A1 through A4. To illustrate, the skill level is beginner, average, or expert. In the example, the skill level is assigned to the user 102 by the one or more processors based on performance levels of the user 102 during game plays preceding to the game play with the context 100 and during the game play with the context 100. In the example, the skill level is an illustration of the state data 302.

Further, in the example, the one or more processors of the game system keep track of an amount of time taken to move, such as press or push, each of the buttons of the HHC 104 (FIG. 1) or an amount of time taken to move one of a set of buttons, such as joysticks, the HHC 104 between two of a plurality of consecutive positions and orientations of the HHC 104 or a combination thereof to engage with the activity A1. In the example, the amount of time taken to move each of the buttons of the HHC 104 is an example of the state data 302. Also, in the example, the amount of time taken to move the set of buttons of the HHC 104 between two of the plurality of consecutive positions and orientations is an example of the state data 302. Moreover, in the example, the one or more processors of the game system keep track of a number of moves, such as presses or pushes, of the buttons of the HHC 104 to engage with the activity A1, and stores the amounts of time and the number of button movements in the one or more memory devices of the game system. In the example, the number of moves is an example of the state data 302. To illustrate, the one or more processors of the game system determine from a time at which the activity A1, such as the virtual characters 106 and 108, is displayed on the display device, it took 10 seconds for the user 102 to push the X button on the HHC 104 to start jumping to avoid being shot by the virtual character 108 (FIG. 1). In the illustration, the one or more processors of the game system determine that it took 15 seconds for the user 102 to push the R1 button on the HHC 104 after pushing the X button to enable the virtual character 106 to shoot at the virtual character 108 and survive against the virtual character 108. In the illustration, each of the X and R1 buttons is an example of one of the buttons of the HHC 104.

Further, in the illustration, the one or more processors of the game system determine the plurality of consecutive positions and orientations of one of the set of buttons, such as a set of joysticks, of the HHC 104 during the movement of the virtual character 106 to survive against the virtual character 108 based on inertial sensor data received from inertial sensors, such as magnetometers, accelerometers, and gyroscopes of the button of the HHC 104. To further illustrate, the plurality of consecutive positions and orientations of one of the set of buttons include a first position (x1, y1, z1), a first orientation ($\theta 1$, $\phi 1$, $\gamma 1$), a second position (x2, y2, z2), and a second orientation ($\theta 2$, $\phi 2$, $\gamma 2$). In the further illustration, each of x1 and x2 is a respective distance along an x-axis from a reference co-ordinate of a body of the HHC 104, each of y1 and y2 is a respective distance along a y-axis from the reference co-ordinate, each of z1 and z2 is a respective distance along a z-axis from the reference co-ordinate, $\theta 1$ is an angle between the x-axis and the first position, $\theta 2$ is an angle between the x-axis and the second position, $\phi 1$ is an angle between the y-axis and the first position, $\phi 2$ is an angle between the y-axis and the second position, $\gamma 1$ is an angle between the z-axis and the first position, and $\gamma 2$ is an angle between the z-axis and the second position. Further, in the example, the one or more processors determine the plurality of consecutive positions and orientations of one of the set of buttons of the HHC 104.

In the example, the one or more processors of the game system identify each of the buttons of the HHC 104 that is moved to distinguish the button from another one of the buttons of the HHC 104 that is moved or not moved. Also, in the example, the one or more processors of the game system determine a sequence, such as an order, in which the buttons of the HHC 104 are moved by the user 102 while engaging with the activity A1. In the example, the plurality of consecutive positions and orientations of one of the set of buttons of the HHC 104, the identity of each of the buttons of the HHC 104 that is moved, and the sequence are examples of the state data 302.

In a similar manner, the state data 302 regarding the activities A2 through A4 of the game context 100 is obtained by the one or more processors of the game system and stored in the one or more memory devices of the game system. Moreover, in a similar manner, state data regarding the game contexts 116 (FIG. 1) is obtained by the one or more processors of the game system and stored in the one or more memory devices of the game system.

FIG. 4 is a diagram of an embodiment of a system 400 to illustrate generation of predictive indicators 426, such as predictive outcomes, based on state data 418 determined from the engagement of the user 102 with the game context 100 and the game contexts 116. The system 400 includes a metadata processor 402, a context labeler 404, an action labeler 406, a metrics labeler 408, a context classifier 410, an action classifier 412, a metrics classifier 414, and a profile model 416. As an example, each of the context labeler 404, the action labeler 406, the metrics labeler 408, the context classifier 410, the action classifier 412, the metrics classifier 414, and the profile model 416 is a hardware component or a software component. To illustrate, each of the context labeler 404, the action labeler 406, the metrics labeler 408, the context classifier 410, the action classifier 412, the metrics classifier 414, and the profile model 416 is a software program or a portion of a software program that is executed by an artificial intelligence (AI) processor. To further illustrate, the profile model 416 is a machine learning model or a neural network or an artificial intelligence model. As another illustration, each of the context labeler 404, the action labeler 406, the metrics labeler 408, the context classifier 410, the action classifier 412, the metrics classifier 414, and the profile model 416 is a hardware circuit portion of an ASIC or a PLD. The AI processor and the metadata processor 402 are examples of the one or more processors of the game system. The system 400 further includes the state data 418, game contexts 420, user interactions 422, and performance metrics 424. An example of the state data 418 includes a combination of the state data 302 (FIG. 3) and the state data generated based on engagement of the user 102 with the game contexts 116.

The one or more processors of the game system collect the state data 418 on-the-fly. For example, the one or more processors of the game system do not interrupt the game program that is executed to generate one of the game contexts 420 while obtaining the state data 418 from one or more of the user interactions 422 with the one of the game contexts 420.

An example of the game contexts 420 includes the game context 100 and the game contexts 116 (FIG. 1). Examples of the user interactions 422 include the amounts of time taken to move the buttons of the HHC 104, the amounts of time taken to move each of the sets of buttons of the HHC 104 between two of the plurality of consecutive positions and orientations of the button of the HHC 104, the number of button movements, the identities of the buttons that are moved, the sequences in which the buttons of the HHC 104 are moved, and the plurality of consecutive positions and orientations of each of the sets of buttons of the HHC 104 during the user interactions 422 with each of the game contexts 420. Moreover, examples of the performance metrics 424 include values determined based on a number of virtual accomplishments collected during each of the game contexts 420, or a skill level of the user 102 during each of the game contexts 420, or a combination thereof during each of the game contexts 420. For example, the one or more processors of the game system generate a first performance metric based on a weighted combination of the average skill level of the user 102 during the activities A1 through A4 of the game context 100 and a first number of virtual accomplishments achieved by the user 102 via the user account 1 during the game context 100. In the example, the one or more processors of the game system generate a second performance metric based on a weighted combination of the expert skill level of the user 102 during one of the game contexts 116 and a second number of virtual accomplishments achieved by the user 102 via the user account 1 during one of the game contexts 116. In the example, the second performance metric is a value greater than or lower than a value of the first performance metric. Further, in the example, the one or more processors of the game system assign a first identifier PM1 to the first performance metric and a second identifier PM2 to the second performance metric. In the example, the first and second identifiers PM1 and PM2 are portions of the state data 418.

The one or more processors of the game system assign different identifiers to the game contexts 420 than to the user interactions 422 and the performance metrics 424. For example, the one or more processors of the game system assign identifiers, with each of the identifiers having a term GC to the game contexts 420. Further, in the example, the one or more processors of the game system assign identifiers, with each of the identifiers having a term UI to the user interactions 422. Also, in the example, the one or more processors of the game system assign identifiers, with each of the identifiers having a term PM to the performance metrics 424. The identifiers of the game contexts 420, the user interactions 422 and the performance metrics 424 are portions of the state data 418.

Also, the one or more processors of the game system assign a different identifier to each of the game contexts 420. For example, the game context 100 is assigned an identifier, such as GC1, and one of the game contexts 116 is assigned an identifier, such as GC2, to distinguish the game context 100 from the one of the game contexts 116.

The one or more processors of the game system further assign a different identifier to each button of the HHC 104 and to each different type of movement of the button. For example, the one or more processors of the game system assign an identifier BT1 to a first button of the HHC 104 and an identifier BT2 to a second button of the HHC 104. Further, in the example, the one or more processors of the game system assign an identifier 1BP to a press of the first button and an identifier 2BPU to a push of the second button. As another example, the one or more processors of the game system assign an identifier 2BPUDU to a push of a button upward, another identifier 2BPUDD to a push of the button downward, yet another identifier 2BPUDR to a push of the button in a right direction, and still another identifier 2BPUDL to a push of the button in a left direction. In the example, the movement in the upward direction, the downward direction, the right direction, and the left direction are types of movements of the button. The identifiers of the buttons and the identifiers of the types of movements of the buttons of the HHC 104 are portions of the state data 418.

Moreover, the one or more processors of the game system provide correspondence identifiers between the buttons of the HHC 104, the types of movements of the buttons, and the game contexts 420. For example, the one or more processors of the game system assign a correspondence identifier CI1 to identify a unique relationship among the identifier of the game context 100, one or more identifiers of one or more buttons of the HHC 104 moved during engagement of the user 102 with the game context 100, and one or more identifiers of one or more types of movements of the one or more buttons during the engagement. The correspondence identifiers are also portions of the state data 418.

The metadata processor 402 is coupled to the context labeler 404, the action labeler 406, and the metrics labeler 408. Also, the context labeler 404 is coupled to the context classifier 410, the action labeler 406 is coupled to the action classifier 412, and the metrics labeler 408 is coupled to the metrics classifier 414. The context classifier 410, the action classifier 412, and the metrics classifier 414 are coupled to the profile model 416. The context labeler 404 is coupled to the action labeler 406 and to the metrics labeler 408.

The metadata processor 402 accesses the state data 418 from the one or more memory devices of the game system and parses the state data 418 to identify the game contexts 420, the user interactions 422, and the performance metrics 424. For example, the metadata processor 402 reads each line of the state data 418 to distinguish among the game contexts 420, user interactions 422, and performance metrics 424. To illustrate, the metadata processor 402 distinguishes among the game contexts 420, user interactions 422, and performance metrics 424 based on the identifiers GC, UI, and PM. To further illustrate, the metadata processor 402 determines that a line of the state data 418 having the identifier GC is one of the game contexts 420 and a line of the state data 418 having the identifier UI is one of the user interactions 422.

The context labeler 404 receives the game contexts 420 from the metadata processor 402 and identifies each of the game contexts 420 to label the game context. For example, the context labeler 404 determines that the game context 100 includes a different set of virtual objects than a set of virtual objects of one of the game contexts 116. To illustrate, the context labeler 404 identifies each virtual object in a game context based on a size, a shape, a color, or a combination thereof of the virtual object, and further determines, from the identities of the virtual objects in the game context, that the game context 100 includes the different set of virtual objects than the set of virtual objects in one of the game contexts 116. To further illustrate, the context labeler 404 identifies that the game context 100 includes the virtual character 106, the virtual character 108, the virtual giant 110, the virtual game chest 112, and the virtual valley 114. In the further illustration, the context labeler 404 identifies that the one of the game contexts 116 includes a virtual avatar, a virtual desktop monitor, a virtual pencil holder, and a virtual desk. In the further illustration, a set of the virtual character 106, the virtual character 108, the virtual giant 110, the virtual game chest 112, and the virtual valley 114 is different from a set of the virtual avatar, the virtual desktop monitor, the virtual pencil holder, and the virtual desk. As another example, the context labeler 404 determines that the game context 100 is assigned a different identifier, such as GC1, by the one or more processors of the game system than an identifier, such as GC2, assigned to one of the game contexts 116 to distinguish the game context 100 from the one of the game contexts 116. The labeling of each of the game contexts 420 distinguishes one of the game contexts 420 from another one of the game contexts 420. The context labeler 404 provides the labels of the game contexts 420 to the action labeler 406 and to the metrics labeler 408.

The action labeler 406 receives the user interactions 422 from the metadata processor 402 and receives the labels of the game contexts 420 from the content labeler 404, and identifies each of the user interactions 422 during each of the game contexts 420 to label each of the user interactions 422. For example, the action labeler 406 distinguishes, based on the identifiers of the buttons of the HHC 104, a button from remaining buttons of the HHC 104, and distinguishes, based on the identifiers of the types of movements of the buttons, the type of movement of the button from another type of movement of the button of the HHC 104 during one of the game contexts 420.

The metrics labeler 408 receives the performance metrics 424 from the metadata processor 402 and receives the labels of the game contexts 420 from the content labeler 404, and identifies each of the performance metrics 424 during each of the game contexts 420 to label each of the performance metrics 424. For example, the metrics labeler 408 distinguishes, based on the identifiers of the performance metrics during one of the game contexts 420, the first performance metric from the second performance metric.

Each label is an identity. For example, a label is a sequence of alphanumeric characters that distinguishes one label from another.

The context classifier 410 receives the labels of the game contexts 420 from the context labeler 404 and classifies each of the game contexts 420 to output game context classifications. For example, the context classifier 410 determines that the game context 100 includes a predetermined number of activities, such as A1 and A2, with each of the activities having an activity level above a predetermined level, such as 3.5. In the example, the context classifier 410 classifies the context 100 as a difficult context. In the example, the difficult context is an example of one of the context classifications. As another example, the context classifier 410 determines that one of the game contexts 116 does not have the predetermined number of activities with each of the activities having an activity level above the predetermined level. In the example, the context classifier 410 determines that the one of the game contexts 116 as an easy context. In the example, the easy context is an example of one of the context classifications.

Similarly, the action classifier 412 receives the labels of the user interactions 422 from the action labeler 406 and classifies each of the user interactions 422 to output action classifications. For example, the action classifier 412 determines that it took greater than a predetermined amount of time for the user 102 to engage in a number of the user interactions 420, such as pushing the X button of the HHC 104, with a number of the game contexts 420. In the example, one of the user interactions 420 occurs to control the virtual character 106 to start jumping to dodge a virtual bullet shot by the virtual character 108 after the virtual characters 106 and 108 (FIG. 1) are displayed within the number of the game contexts 420. Further, in the example, the action classifier 412 classifies each of the number of the user interactions 422 as a hard interaction. In the example, the number of the game contexts 420 is greater than a preset number, and the number of the user interactions 422 is equal to the number of the game contexts 420. As another example, the action classifier 412 determines that the user 102 engages in a number of the user interactions 422, such as pressing a square button used for reloading a virtual gun instead of an R1 button used to shoot at the virtual giant 110 (FIG. 1). In the example, the number of user interactions 422 occur to engage with a number of the game contexts 420, such as the game context 100 (FIG. 1). In the example, the action classifier 412 classifies each of the number of the user interactions 422 of pressing the square button as a hard interaction. In the example, the number of the game contexts 420 is greater than a preset number, and the number of the user interactions 422 is equal to the number of the game contexts 420. In the example, the R1 button for shooting is a predetermined button to be pressed to shoot. As yet another example, the action classifier 412 determines that the user 102 engages via a number of the user interactions 422 with the number of the game contexts 420. In the example, an illustration of each of the number of the user interactions 422 is selecting, such as pressing, a sequence of buttons on the HHC 104 different from a predetermined sequence of buttons on the HHC 104 to fight and survive against the virtual giant 110 in each of the number of the game contexts 420. Further, in the example, the action classifier 412 classifies each of the number of the user interactions 422 as a hard interaction. In the example, the number of the game contexts 420 is greater than a preset number, and the number of the user interactions 422 is equal to the number of the game contexts 420.

In the preceding three examples, the hard interactions are examples of the action classifications. As yet another example, the action classifier 412 determines that it took less than or equal to the predetermined amount of time for the user 102 to push the X button button of the HHC 104 to start jumping after the virtual character 108 is displayed within the game context 100 (FIG. 1), and therefore classifies one of the user interactions 422 of pushing the button as an easy interaction. As another example, the action classifier 412 determines that the user 102 presses the R1 button to shoot at the virtual giant 110, and so classifies one of the user interactions 422 of pressing the R1 button, which is the predetermined button, as an easy interaction. As yet another example, the action classifier 412 determines that the user 102 selects, such as presses, the predetermined sequence of buttons on the HHC 104 to fight the virtual giant 110 to classify one of the user interactions 422 as an easy interaction. In the preceding three examples, the easy interactions are examples of the action classifications.

Moreover, the metrics classifier 414 receives the labels of the performance metrics 424 from the metrics labeler 408 and classifies each of the performance metrics 424 to output metrics classifications. For example, the metrics classifier 414 determines that the first performance metric is above a predetermined threshold to determine that the user 102 has a high performance metric while interacting with the activities A1 through A4 of the game context 100. In the example, the metrics classifier 414 determines that the second performance metric is below the predetermined threshold to determine that the user 102 has a low performance metric while interacting with the activities A1 through A4 of the game context 100. Further, in the example, the metrics classifier 414 determines that the second performance metric is at the predetermined threshold to determine that the user 102 has an average or a low performance metric while interacting with the activities A1 through A4 of the game context 100. In the example, the high, low, and average performance metrics are examples of the metrics classifications.

Each classification is a level. For example, the difficult context is a classification level and the easy context is another classification level. As another example, the hard interaction is a classification level and the easy interaction is a classification level. As yet another example, the high performance metric is a classification level and the average or low performance metric is a classification level.

The action classifier 412 provides the labels of the user interactions 422 to the profile model 416. For example, the action classifier 412 provides the labels indicating which of the buttons of the HHC 104 is moved by the user 102, the positions and orientations of the set of buttons, such as the joysticks, of the HHC 104, and the types of movements, such as, as button presses or button pushes or a button push in a direction. The profile model 416 also receives the context classifications from the context classifier 410, the action classifications from the action classifier 412, and the metrics classifications from the metrics classifier 414 to generate the predictive indicators 426. For example, the profile model 416 identifies, from the metrics classifications, that in a number of the game contexts 420 greater than a preset threshold, the metrics classifications are high performance metrics. Further, in the example, the profile model 416 identifies that each of the number of the game contexts 420 is a hard context from the context classifications received from the context classifier 410. Moreover, in the example, the profile model 416 identifies that while engaging with the number of the game contexts 420, interactions by the user 102 are easy interactions. In the example, correspondences between the high performance metrics, the hard contexts, and the easy interactions are an example of relationships. In the example, the profile model 416 generates a favorable predictive indicator for the user 102 indicating that the user 102 will achieve, in the future, a high performance metric during a game session in which a game context similar to one or more of the number of the game contexts 420 is displayed.

As an example, each of the predictive indicators 426 is an indication of a gaming skill of the user 102. To illustrate, each of the predictive indicators 426 indicates whether the user 102 will achieve a goal of the game context similar to one or more of the number of the game contexts 420. In the illustration, the goal is to perform and finish one or more of the activities A1 through A4 of the similar game context. In the illustration, when the goal is not achieved, the user 102 does not advance or move forward in a game having the similar game context. To further illustrate, when the user 102 cannot complete the activities A1 through A4 of the similar game context of the game, the one or more processors of the game system cannot display another game context of the game. In the further illustration, the other game context consecutively follows the similar game context according to the game. As another illustration, the goal is to score a predetermined number of virtual points by interacting with the similar game context. In the illustration, when the goal is not achieved, the user 102 does not advance in the game having the similar game context. To further illustrate, when the user 102 cannot score the predetermined number of virtual points in the similar game context, the one or more processors of the game system cannot display another game context of the game.

As another example, the profile model 416 identifies, from the metrics classifications, that in a number of the game contexts 420 greater than the preset threshold, the metrics classifications are average or low performance metrics. Further, in the example, the profile model 416 identifies that each of the number of the game contexts 420 is a hard or easy context from the context classifications received from the context classifier 410. Moreover, in the example, the profile model 416 identifies that while engaging with the number of the game contexts 420, interactions by the user 102 are hard interactions. In the example, correspondences between the average or low performance metrics, the hard or easy contexts, and the hard or easy interactions are an example of relationships. In the example, the profile model 416 generates an unfavorable predictive indicator for the user 102 indicating that the user 102 will achieve a low or average performance metric during a game session in which a game context similar to one or more of the number of the game contexts 420 is displayed. In the example, the unfavorable predictive indicator indicates a lack of one or more gaming skills in the user 102. To illustrate, the unfavorable predictive indicator indicates that the user 102 will, in the future, push a different sequence of buttons of the HHC 104 than a predetermined sequence for achieving a goal in the game context similar to one or more of the number of the game contexts 420. As another illustration, the unfavorable predictive indicator indicates that the user 102 will, in the future, push a joystick of the HHC 104 in an upward direction instead of a downward direction in the game context similar to one or more of the number of the game contexts 420. In the illustration, the downward direction is a predetermined direction for achieving a goal in the game context similar to one or more of the number of the game contexts 420.

As still another example, the profile model 416 identifies, from the metrics classifications, that in a number of the game contexts 420 equal to or less than the preset threshold, the metrics classifications are high performance metrics. In the example, the number of the game contexts 420 is equal to a number of the metrics classifications. Further, in the example, the profile model 416 identifies that each of the number of the game contexts 420 is a hard context from the context classifications received from the context classifier 410. Moreover, in the example, the profile model 416 identifies that while engaging with the number of the game contexts 420, a number of the user interactions 422 by the user 102 are easy interactions. In the example, the number of the user interactions are equal to, less than, or greater than the number of the game contexts 420. In the example, the profile model 416 generates an unfavorable predictive indicator for the user 102 indicating that the user 102 will achieve a low performance metric during a game session in which a game context similar to one or more of the number of the game contexts 420 is displayed.

As yet another example, the profile model 416 identifies, from the metrics classifications, that in a number of the game contexts 420 equal to or less than the preset threshold, the number of metrics classifications are high performance metrics. In the example, the number of the game contexts 420 is greater than a preset number, and the number of the metrics classifications is equal to the number of the game contexts 420. Further, in the example, the number of metrics classifications is equal to a number of the performance metrics 424 for the number of the game contexts 420.

Further, in the example, the profile model 416 identifies that each of the number of the game contexts 420 is an easy context from the context classifications received from the context classifier 410. Moreover, in the example, the profile model 416 identifies that while engaging with the number of the game contexts 420, interactions by the user 102 are hard interactions. In the example, the profile model 416 generates an unfavorable predictive indicator for the user 102 indicating that the user 102 will achieve a low performance metric during a game session in which a game context similar to one or more of the number of the game contexts 420 is displayed. It should be noted that the generation of the predictive indicators 426 based on the context classifications received from the context classifier 410, the action classifications received from the action classifier 412, and the metrics classifications received from the metrics classifier 414 is an example of training the profile model 426.

In one embodiment, the metadata processor 402 does not access the state data 418 from the one or more memory devices of the game system. Rather, in the example, the metadata processor 402 accesses the state data 418 directly from the one or more processors of the game system that obtain the state data 418 during the user interactions 422 with the game contexts 420.

In an embodiment, the terms game context and select context are used herein interchangeably.

In one embodiment, a high performance metric is generated by the one or more processors of the game system when a predetermined number of activities of a preset number of the game contexts 420 are completed by the user 102 via the user account 1 and the HHC 104. In the embodiment, a low performance metric is generated by the one or more processors of the game system when the predetermined number of activities of the preset number of the game contexts 420 is not completed by the user 102 via the user account 1 and the HHC 104.

In an embodiment, a hard interaction is sometimes referred to herein as an incorrect interaction and an easy interaction is sometimes referred to herein as a correct interaction.

FIG. 5 is a diagram of an embodiment of system 500 to illustrate use of a game system 502 and the HHC 104 to provide assistance input data 506 to the user 102 via the HHC 104 based on the predictive indicators 426. The system 500 includes the game system 502, such as the computing device or the cloud system. The system 500 further includes a display device 514, which is an example of the display device of the client device.

The game system 502 includes the state data 418, the metadata processor 402, the performance metrics 424, the profile model 416, an assistance data generator 504, the assistance input data 506, a game program 510 of a game, current gameplay data 508, and an assistance input feature 512. As an example, the game having the game program 510 is the same as that or different from one or more of the games based on which the predictive indicators 426 are generated. An example of the assistance data generator 504 is the one or more processors of the game system 502.

An example of the assistance input feature 512 is hardware or software. To illustrate, the assistance input feature 512 is a software program that is executed by the one or more processors of the game system 502. As another illustration, the assistance input feature 512 is an ASIC or a PLD or another integrated circuit of the game system 502.

Similarly, an example of the assistance data generator 504 is hardware or software. To illustrate, the assistance data generator 504 is a software program that is executed by the one or more processors of the game system 502. As another illustration, the assistance data generator 504 is an ASIC or a PLD or another integrated circuit of the game system 502.

The profile model 416 is coupled to the assistance input feature 512, which is coupled to the game program 510. The profile model 416 provides the predictive indicators 426 to the assistance input feature 512. For example, the one or more processors of the game system 502 that execute the assistance input feature 512 receive the predictive indicators 426 from the profile model 416. The assistance data generator 504 is also coupled to the profile model 416 and to the assistance input feature 512. The assistance input feature 512 and the game program 510 are coupled to the HHC 104. The assistance data generator 504 is coupled to the game program 510.

During or after occurrences of the game sessions from which the predictive indicators 426 are generated, the user 102 logs into the user account 1 and uses the HHC 104 to generate and send a request to access the game having the game program 510. Once the user 102 logs into the user account 1 and is provided access to the game by the one or more processors of the game system 502, the one or more processors of the game system 502 send a request to the client device to display a prompt on the display device 514 to determine whether the user 102 wishes to use the assistance input feature 512 during execution of the game program 510. The user 102 uses the HHC 104 to indicate that the user 102 wishes to use the assistance input feature 512, and the HHC 104 sends the indication to the game system 502. Once the indication is received from the HHC 104, the game program 510 is executed by the one or more processors of the game system 502 with the assistance input feature 512 to initiate a current game session of the game on the display device 514. The assistance input feature 512 receives the predictive indicators 426 from the profile model 416 and applies the predictive indicators 426. Upon receiving another indication that the user 102 does not wish to apply the assistance input feature 512, the game program 510 is executed without applying the assistance input feature 512.

During the current game session, the one or more processors of the game system 502 generate the current gameplay data 508 when the game program 510 is executed. To illustrate, the current gameplay data 508 includes a current game context of the game having the game program 510, multiple user interactions of the user 102 with the current game context, and performance metrics determined by the one or more processors of the game system 502 based on the user interactions with the current game context.

During or before the current game session based on which the current gameplay data 508 is generated, the assistance data generator 504 accesses the profile model 416 to receive the predictive indicators 426 from the profile model 416. For example, the assistance data generator 504 requests the predictive indicators 426 from the profile model 416. In the example, the profile model 416 sends the predictive indicators 426 to the assistance data generator 504 in response to the request. Then, the assistance data generator 504 processes, such as analyzes, the predictive indicators 426 to generate or output the assistance input data 506. For example, the assistance data generator 504 receives an unfavorable predictive indicator generated based on one or more of the user interactions 422 with one or more of the game contexts 420. In the example, the assistance input data 506 is generated to modify the unfavorable predictive indicator to a favorable predictive indicator. In the example, the unfavorable predictive indicator indicates that the user 102 will be unable to complete a task, such as kill a virtual character, or achieve a predetermined number of virtual points, or cross a virtual valley, or cross a virtual mountain, or kill the virtual character 108, or kill the virtual giant 110, or a combination thereof, in the game having the current game context.

In the example, the assistance data generator 504 communicates with the game program 510 to generate the assistance input data 506 to modify the unfavorable predictive indicator to the favorable predictive indicator. To illustrate, the assistance data generator 504 identifies based on the labels of the user interactions 422 received from the action classifier 412 that the user 102 selected the square button instead of the R1 button to shoot at one or more virtual objects, such as the virtual giant 110 (FIG. 1), during one or more of the preset amount of the game contexts 420. In the illustration, the assistance data generator 504 communicates with the game program 510 to determine that the R1 button is to be pressed instead of the square button to modify one or more unfavorable predictive indicators for the one or more of the preset amount of the game contexts 420 to one or more favorable predictive indicators. Further, in the illustration, the assistance data generator 504 generates the assistance input data 506 to suggest, such as indicate, to the user 102 that the user 102 select the R1 button instead of the square button during or immediately before the current game context. In the illustration, the selection of the R1 button is an example of a type of input. In the illustration, the assistance input data 506 is light data to highlight the R1 button or press input data to control the R1 button to be pushed downward. In the illustration, the press input data is an example of controller input data.

As another illustration, the assistance data generator 504 identifies based on the labels of the user interactions 422 received from the action classifier 412 that the user 102 operates the HHC 104 to select a set of buttons of the HHC 104 according a first sequence or a first consecutive order. In the illustration, the assistance data generator 504 communicates with the game program 510 to determine that the set of buttons of the HHC 104 be selected according to a second sequence or a second consecutive order to modify one or more unfavorable predictive indicators for the one or more of the preset amount of the game contexts 420 to one or more favorable predictive indicators. In the illustration, the one or more unfavorable predictive indicators indicate that that the user 102 will be unable to complete a task in the game having the current game context. In the illustration, the assistance data generator 504 generates the assistance input data 506 to suggest, such as indicate, to the user 102 that the user 102 select the set of buttons according to the second sequence during or immediately before the current game context. In the illustration, the selection of the set of buttons according to the second sequence is an example of a type of input. In the illustration, the assistance input data 506 is light data to highlight the set of buttons in the order of the second sequence or press input data to push the set of buttons downward according to the second sequence. In the illustration, the press input data is an example of controller input data.

As another example, upon receiving the predictive indicators 426 that are favorable for the preset amount of the game contexts 420, the assistance data generator 504 does not output the assistance input data 506 to provide to the assistance input feature 512.

During the current game session, the assistance data generator 504 provides the assistance input data 506 to the assistance input feature 512. The assistance input feature 512, which receives the assistance input data 506, is executed by the one or more processors of the game system 502 to apply the assistance input data 506 to correct for a user interaction during execution of the game program 510 to play the game in the current game session.

While the user 102 is playing the game based on which the current gameplay data 508 is generated, the assistance input feature 512 processes, such as analyzes, the predictive indicators 426 and the current gameplay data 508 to determine whether to send the assistance input data 506 to the HHC 104. For example, the assistance input feature 512 receives an unfavorable predictive indicator generated based on one or more of the user interactions 422 with one or more of the game contexts 420. In the example, the assistance input feature 512 obtains the gameplay data 508 from the game program 510, detects, such as identifies, the current game context, which the user 102 is interacting with, from the gameplay data 508, and determines whether the current game context is similar to the preset amount of the game contexts 420 based on which the unfavorable predictive indicators are generated. To illustrate, the assistance input feature 512 determines whether a preset amount of virtual objects in the current game context matches the preset amount of virtual objects in each of the preset amount of the game contexts 420 based on which the unfavorable predictive indicators are generated. In the illustration, the preset amount of virtual objects is identified based on sizes, shapes, and colors of the virtual objects. Further, in the illustration, upon determining that the preset amount of virtual objects in the current game context matches the preset amount of virtual objects in the preset amount of the game contexts 420, the assistance input feature 512 determines that the current game context is similar to the preset amount of the game contexts 420 and determines to send the assistance input data 506 to the HHC 104. In the illustration, on the other hand, upon determining that the preset amount of virtual objects in the current game context do not match the preset amount of virtual objects in the preset amount of the game contexts 420, the assistance input feature 512 determines that the current game context is not similar to the preset amount of the game contexts 420 and does not sent the assistance input data 506 for the current game context to the HHC 104.

Continuing with the example, the assistance input feature 512 activates an assistance cue, such as sends the assistance input data 506, to the HHC 104 upon determining that the current game context is similar to the preset amount of the game contexts 420 based on which the predictive indicators 426 are generated. In the example, the assistance input data 506 is sent to modify a potentially unfavorable predictive indicator for the current game context to a favorable predictive indicator. To illustrate, the assistance data generator 504 identifies based on the labels of the user interactions 422 received from the action classifier 412 that the user 102 selected the square button instead of the R1 button during the preset amount of the game contexts 420 for which the unfavorable predictive indicators are generated. In the illustration, the assistance data generator 504 provides the assistance input data 506 to the assistance input feature 512. In the illustration, before the user 102 is about to interact with the current game context, such as perform a task of fighting with the virtual character 108 or the virtual giant 110 (FIG. 1), the assistance input feature 512 sends the assistance input data 506 to the HHC 104 to indicate to the user 102 that the user 102 select the R1 button instead of the square button. In the illustration, the assistance input data 506 is light data to emit a light from the R1 button or press input data to control the R1 button to be pushed automatically or a combination thereof. In the illustration, the assistance input data 506 is sent after the current game context is generated but before the user 102 interacts with the current game context. In the illustration, the assistance input data 506 is sent via the computer network from the game system 502 to the HHC 104 in case the game system 502 is the cloud system. Further, in the illustration, the assistance input data 506 is sent from the game system 502 to the HHC 104 via a wired or wireless communication medium in case the game system 502 is the computing device. An example of a wired communication medium is a cable and an example of the wireless communication medium is a medium that applies a wireless protocol for communication, such as Bluetooth™ or Wi-Fi™.

As another illustration, the assistance data generator 504 identifies based on the labels of the user interactions 422 received from the action classifier 412 that during one or more of the game contexts 420 similar to the current game context, the user 102 selects the square button on the HHC 104. In the illustration, the assistance data generator 504 identifies that one of the predictive indicators 426 corresponding to the selection of the square button is unfavorable. In the illustration, the assistance data generator 504 provides the assistance input data 506 to the assistance input feature 512. Further, in the illustration, before the user 102 is about to interact with the current game context, the assistance input feature 512 sends the assistance input data 506 to the HHC 104 to indicate to the user 102 that the user 102 select the R1 button.

As yet another illustration, the assistance data generator 504 identifies based on the labels of the user interactions 422 received from the action classifier 412 that during one or more of the game contexts 420 similar to the current game context, the user 102 operated the HHC 104 to select the set of buttons of the HHC 104 according the first sequence or the first consecutive order. In the illustration, the assistance data generator 504 identifies that one of the predictive indicators 426 corresponding to the selection of the set of buttons according to the first sequence is unfavorable. In the illustration, the assistance data generator 504 provides the assistance input data 506 to the assistance input feature 512. In the illustration, before the user 102 is about to interact with the current game context, the assistance input feature 512 sends the assistance input data 506 to the HHC 104 to suggest, such as indicate, to the user 102 that the user 102 select the set of buttons according to the second sequence. When the assistance input data 506 is sent to the HHC 104, the predictive game assistance is provided to the user 102 via the user account 1 and the HHC 104.

During any time in which a game context, such as the current game context or a next game context, is being displayed on the display device 514, the one or more processors of the game system 502 determine whether the assistance input feature 512 is to be discontinued. For example, the predictive indicators 426 are modified or additional predictive indicators are generated based on interactions of the user 102 with one or more game contexts, such as the current game context and the next game context. In the example, the interactions of the user 102 occur after the assistance input feature 512 is applied to modify one or more of the predictive indicators 426 from being unfavorable to favorable. Further, in the example, the assistance input feature 512 determines whether at least a predetermined number of the predictive indicators 426 are modified from being unfavorable to favorable based on the user interactions with the one or more game contexts. In the example, upon determining so, the one or more processors deactivate the assistance input feature 512 to not apply the assistance input feature 512 to the game program 510 during the game context, such as the current game context or the next game context. As an example, the next game context occurs during a next game session that occurs after the current game session during which the current gameplay data 508 is generated. As another example, the one or more processors determine whether a predetermined number of virtual points is achieved during the one or more game contexts or a predetermined result is achieved during the one or more game contexts or a predetermined number of game tasks are achieved during the one or more game contexts or a combination thereof. In the example, upon determining so, the one or more processors deactivate the assistance input feature 512.

In an embodiment, the user 102 uses the HHC 104 to deactivate the assistance input feature 512 at any point in the game context, such as the current game context or the next game context.

In one embodiment, the assistance input feature 512 is integrated with the game program 510. For example, the one or more processors of the game system 502 execute a program including the assistance input feature 512 and the game program 510 in a time multiplexed manner.

In an embodiment, two or more of the assistance data generator 504, the assistance input data 506, the assistance input feature 512, and the game program 510 are integrated with each other. For example, the one or more processors of the game system 502 execute a program including the assistance data generator 504, the assistance input feature 512 and the game program 510 in a time multiplexed manner.

In one embodiment, the one or more processors of the game system 502 learn a game style of the user 102 during a training session or a calibration session of a game before the current game context to determine one or more of the predictive indicators 426, and apply the one or more of the predictive indicators 426 to control, such as press or highlight, one or more buttons of the HHC 104 for the user 102 during the current game context. Moreover, in the embodiment, in addition to or as an alternative to controlling the one or more buttons of the HHC 104, the one or more processors of the game system 502 control the game program 510 based on the one or more predictive indicators 426 generated based on the training or calibration session. For example, the one or more processors of the game system 502 execute one or more tests, such as, notify the user 102 to achieve a task in the training session or the calibration session quickly, jump over a virtual object, etc., to determine the game style of the user 102. In the example, the one or more processors of the game system 502 save the game style in a user profile of the user 102 to build the profile model 416 and use the game style for calibrating the game for the user 102. For example, the one or more processors of the game system 502 modify one or more portions of the current game context to adjust the game program 510 downward before the current game context is displayed on the display device 514. In the example, the one or more portions of the current game context are modified to output one or more modified current game contexts to enable the user 102 to increase a performance metric during interaction with the current game context. To illustrate, the one or more processors of the game 502 modify the current game context to remove an activity, such as the activity A2, or to modify functionality of one or more virtual objects, such as modify functionality of the virtual giant 112 (FIG. 1) to attack the virtual character 106 (FIG. 1) less than a predetermined number of times, or to replace the activity with another easy activity. In the further illustration, the activity has the activity level greater than a predetermined level, such as 3.5, and the easy activity has the activity level less than the predetermined level. As another illustration, the one or more processors of the game 502 modify the current game context to reduce a speed with which one or more virtual objects move within the current game context.

In one embodiment, the one or more processors of the game system 502 determine a mood or intensity of the user 102, such feeling chill or intense, etc., and adjust a mode of gameplay of a game based on the mood or intensity. For example, the mode is adjusted to being an easy mode or a hard mode based on the mood or intensity expressed by the user 102. To illustrate, the one or more processors of the game system 502 receive, via one or more microphones, of the HHC 104, audio data based on sounds emitted by the user 102 during the calibration or training session. In the illustration, the one or more processors of the game system 502 compared the audio data with predetermined audio data to determine whether the user 102 is upset or relaxed. In the illustration, upon determining that the user 102 is upset, the one or more processors of the game system 502 adjust the game downward to display the current game context in the manner described above. Further, in the illustration, upon determining that the user 102 is relaxed, the one or more processors of the game system 502 do not adjust the game downward or adjust the game upward to display the current game context. To further illustrate, the one or more processors of the game system 502 modify one or more portions of the current game context to adjust the game program 510 upward before the current game context is displayed on the display device 514. In the further illustration, the one or more portions of the current game context are modified to output one or more modified current game contexts to challenge the user 102 during interaction with the current game context. In the further illustration, the one or more processors of the game 502 modify the current game context to add an activity to the activities A1 through A4, or to modify functionality of one or more virtual objects, such as modify functionality of the virtual giant 112 (FIG. 1) to attack the virtual character 106 (FIG. 1) greater than a predetermined number of times, or to replace one or more of the activities A1 through A4 with a harder activity. In the illustration, the harder activity has an activity level greater than 8. As another further illustration, the one or more processors of the game 502 modify the current game context to increase a speed with which one or more virtual objects move within the current game context to challenge the user 102.

In an embodiment, the one or more processors of the game system 502 adjust the game downward upon determining, based on the user profile, that the user 102 is a novice player. In the embodiment, the one or more processors of the game system 502 adjust the game upward upon determining, based on the user profile, that the user 102 is an experienced player. Further, in the embodiment, the one or more processors of the game system 502 do not adjust the game upward or downward upon determining, based on the user profile, that the user 102 is a medium player. In the embodiment, the medium player has a level between the experienced player and the novice player.

Figure 6:
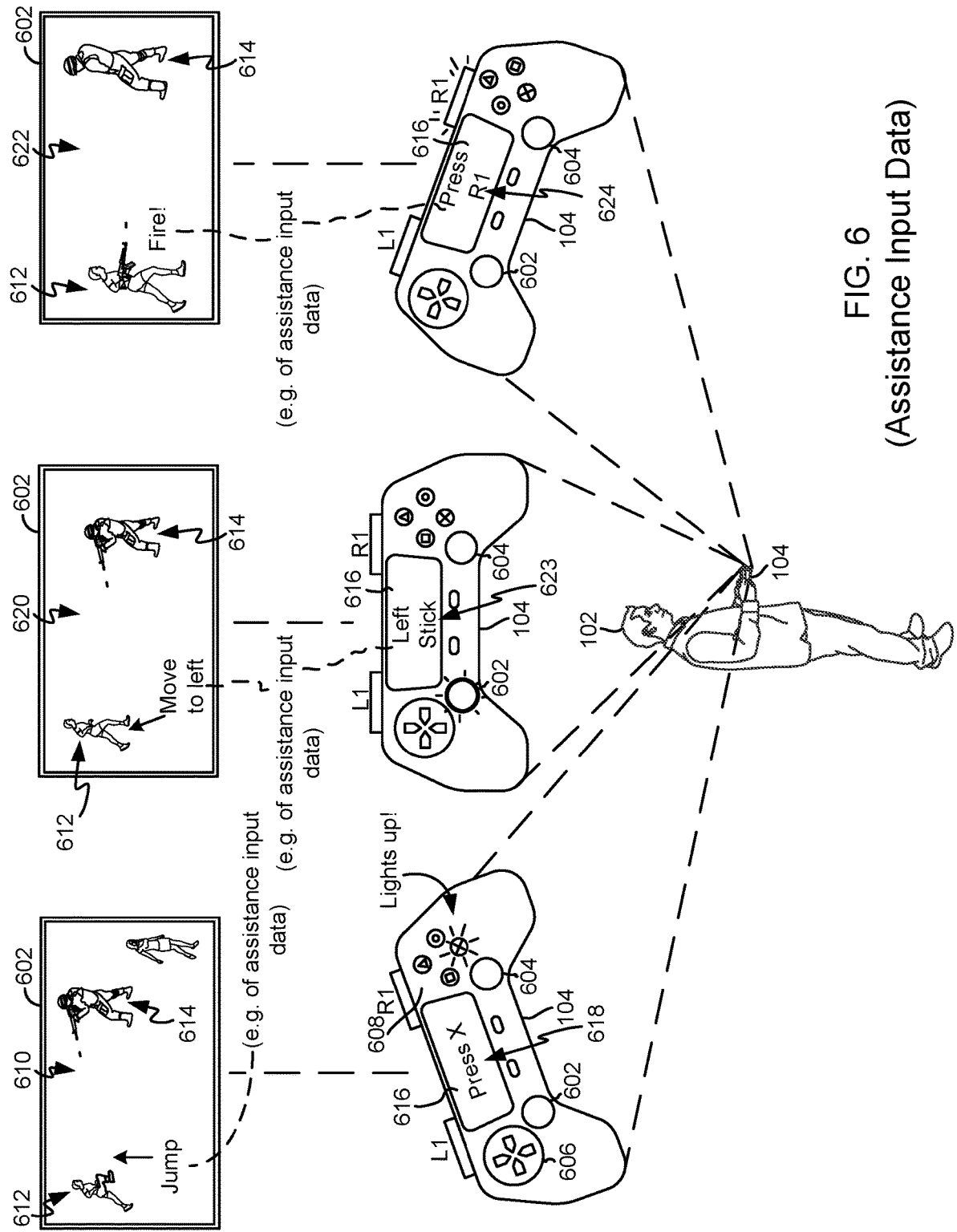
FIG. 6 is a diagram of an embodiment of a system to illustrate that the assistance input data is generated and sent to one or more different regions of the HHC.

FIG. 6 is a diagram of an embodiment of a system 600 to illustrate that the assistance input data 506 is generated and sent for multiple different regions of the HHC 104. The system 600 includes a display device 602 and the HHC 104. The display device 602 is an example of the display device 514 (FIG. 5). Examples of the display device 602 include a display device of the desktop computer, a display device of the laptop computer, a display device of the HMD, a display device of the smart television, and a display device of the smartphone. Also, the HHC 104 includes a display device 616 having a display screen. The HHC 104 further includes a processor and a graphics processing unit (GPU) of the display device of the HHC 104. The processor of the HHC 104 is coupled to the GPU of the HHC 104, and the GPU is coupled to the display screen of the HHC 104.

The HHC 104 includes a left joystick 602 and a right joystick 604. The HHC 104 further includes a directional pad 606, which includes directional buttons, such as a move up button, a move down button, a move right button, and a move left button. The HHC 104 also includes an X button, an O button, a triangle button, and a square button. The HHC 104 has an L1 button and an R1 button. Each of the left joystick 602 and the right joystick 604 is an example of a button of the HHC 104. Moreover, each button of the HHC 104 is an example of a component of the HHC 104, and each component of the HHC 104 is an example of a region of the HHC 104. The HHC 104 includes a body 608, such as a housing, from which the left joystick 602 and the right joystick 604 extend vertically upward.

The processor of the HHC 104 is coupled via a respective driver to a respective light system associated with each component of the HHC 104. For example, the processor of the HHC 104 is coupled via a first driver to a first light system associated with an X button on the HHC 104 and is coupled via a second driver to a second light system associated with an O button of the HHC 104. In the example, the processor of the HHC 104 is coupled via a third driver to a third light system associated with the left joystick 602 and is coupled via a fourth driver to a fourth light system associated with the right joystick 604. Further, in the example, the processor of the HHC 104 is coupled via a fifth driver to a fifth light system associated with the L1 button and is coupled via a sixth driver to a sixth light system associated with the R1 button. An example of a driver is one or more transistors that are coupled to each other. An example of a light system, includes one or more light emitters, such as light emitting diodes (LEDs) or light sources or LED strips or a string of LED lights or laser lights or light bulbs. Each light emitter emits visible light that is visible to a user.

As an example, a light system is associated with a button of the HHC 104 when light emitted from the light system highlights the button to the user 102 to motivate the user 102 to press the button. As an illustration, the X button is fabricated from a transparent or a translucent material, such as plastic, and the first light system is attached to a bottom surface of the X button. In the illustration, the first light system includes one or more LED lights that are attached to the bottom surface of the X button to be located under a top surface of the transparent or a translucent material. As another illustration, the third light system includes one or more LED lights that encircle a head or a body of the left joystick 602 to highlight the left joystick 602. Further, in the illustration, the third light system is located within an enclosure of the body 608 of the HHC 104 and form a shape of a circle having a diameter larger than a diameter of the left joystick 602. In the illustration, the left joystick 602 has its body located below its head and integrated at a junction with the head.

Also, the processor of the HHC 104 is coupled via a respective driver and a respective drive system to a respective button of the HHC 104. For example, the processor of the HHC 104 is coupled via a primary driver and a primary drive system to the X button on the HHC 104 and is coupled via a secondary driver and a secondary drive system to the O button of the HHC 104. In the example, the processor of the HHC 104 is coupled via a tertiary driver and a tertiary drive system to the L1 button of the HHC 104 and via a quaternary driver and quaternary drive system to the R1 button of the HHC 104. An example of a driver system includes a coil and a magnet. In the example, the coil is proximate to the magnet at one end and to a driver at an opposite end. In the example, the coil is proximate to the magnet when a magnetic field induced by a current flowing through the coil interferes with a magnetic field of the magnet. Further, in the example, the magnet is in proximity to a button of the HHC 104 to control, such as press, the button. To illustrate, the magnet is attached to or fixed to an underside of the button to control the button.

Also, the processor of the HHC 104 is coupled via audio drivers and audio drive systems to speakers of the HHC 104. For example, the processor of the HHC 104 is coupled via a first audio driver and a first audio drive system to a first speaker of the HHC 104 and via a second audio driver and a second audio driver system to a second speaker of the HHC 104. An example of an audio driver includes one or more transistors. An example of an audio drive system includes an arrangement of one or more coils and one or more magnets. An example of the speakers includes diaphragms. In the example, the one or more magnets of a speaker are in proximity to the diaphragm of the speaker.

The processor of the HHC 104 receives the assistance input data 506 (FIG. 5) from the game system 502 (FIG. 5). The assistance input data 506 is received by the processor of the HHC 104 before the user 102 is about to interact with a game context 610. The assistance input data 506 indicates to the processor of the HHC 104 to highlight the X button to indicate to the user 102 to press the X button. Upon receiving the assistance input data 506 indicating to press the X button, the processor of the HHC 104 sends a control signal to the first driver. Upon receiving the control signal, the first driver generates a current signal and sends the current signal to the first light system. Upon receiving the current signal, the first light system, which is associated with the X button, illuminates to highlight the X button. When the user 102 selects, such as presses, the X button, which is highlighted, a virtual character 612 is controlled by the user 102 to jump to prevent the virtual character 612 from being shot by another virtual character 614 of the game context 610.

In addition or as an alternative to highlighting the X button, the assistance input data 506 includes notification data, such as screen text data, for displaying a notification 618, such as "Press X", to motivate the user 102 to press the X button to interact with the game context 610. The assistance input data 506 indicates to the processor of the HHC 104 to control the display device 602 to generate the notification 618 indicating the user 102 to press the X button. Upon receiving the assistance input data 506, the processor of the HHC 104 sends the assistance input data 506 to the GPU of the HHC 104. Upon receiving the assistance input data 506, the GPU controls the display screen of the HHC 104 to display the notification 618 on the display screen of the display device 602.

In addition or as an alternative to displaying the notification 618 and in addition or as an alternative to highlighting the X button, the assistance input data 506 includes audio data for generating a sound, such as "Press X", to motivate the user 102 to press the X button within the game context 610. The assistance input data 506 indicates to the processor of the HHC 104 to control the speakers of the HHC 104 to generate the sound indicating the user 102 to press the X button. Upon receiving the assistance input data 506, the processor of the HHC 104 generates a control signal and sends the control signal to the audio drivers of the HHC 104. Upon receiving the control signal, the audio drivers output current signals to the audio drive systems. The audio drive systems generate a magnetic field to control the diaphragms of the speakers to output the sound, such as "Press X", to motivate the user 102 to press the X button.

In addition or as an alternative to displaying the notification 618 and in addition or as an alternative to highlighting the X button and in addition to or as an alternative to displaying the notification 618, the assistance input data 506 indicates to the processor of the HHC 104 to control the X button to automatically select, such as press, the X button. Upon receiving the assistance input data 506 to indicate to press the X button, the processor of the HHC 104 sends a control signal to the primary driver. Upon receiving the control signal, the primary driver generates a current signal and sends the current signal to the coil of the primary drive system. Upon receiving the current signal, the coil of primary drive system generates a magnetic field. The magnetic field interacts with a magnetic field of the magnet of the primary drive system to control, such as press, the X button downward towards the body 608.

Similarly, the assistance input data 506 is received by the HHC 104 before the user 102 is about to interact with a game context 620. The assistance input data 506 indicates to the processor of the HHC 104 to move the left joystick 602. The selection of the left joystick 602 helps the user 102 to advance in the game context 620. For example, the selection of the left joystick 602 increases a number of virtual points scored via the user account 1. As another example, the selection of the left joystick 602 helps the virtual character 612 stay alive in the game context 620 to enable the virtual character 616 to advance to a game context 622. Upon receiving the assistance input data 506 to indicate to select the left joystick 602, the processor of the HHC 104 sends a control signal to the third driver. Upon receiving the control signal, the third driver generates a current signal and sends the current signal to the fourth light system. Upon receiving the current signal, the third light system, which is coupled to the left joystick 602, turns on and emits light to highlight the left joystick 602. When the user 102 moves the left joystick 602, the virtual character 612 is controlled by the user 102 to move left to prevent the virtual character 612 from being shot by the virtual character 614 of the game context 616.

In addition or as an alternative to highlighting the left joystick 602, the assistance input data 506 includes notification data, such as screen text data, for displaying a notification 623, such as "Left Stick", to motivate the user 102 to move the left joystick 602 to interact with the game context 620. The assistance input data 506 indicates to the processor of the HHC 104 to control the display device 602 to generate the notification 623 indicating the user 102 to press the left joystick 602. Upon receiving the assistance input data 506, the processor of the HHC 104 sends the assistance input data 506 to the GPU of the HHC 104. Upon receiving the assistance input data 506, the GPU controls the display screen of the HHC 104 to display the notification 623 on the display screen.

Also, the assistance input data 506 is received by the HHC 104 before the user 102 is about to interact with the game context 622. The assistance input data 506 indicates to the processor of the HHC 104 to highlight the R1 button to suggest, such as indicate, to the user 102 to select, such as press, the R1 button. Upon receiving the assistance input data 506 to indicate to select the R1 button, the processor of the HHC 104 sends a control signal to the sixth driver. Upon receiving the control signal, the sixth driver generates a current signal and sends the current signal to the sixth light system. Upon receiving the current signal, the sixth light system, which is coupled to the R1 button, turns on, such as receives power from a voltage source, to illuminate the R1 button. When the user 102 selects the R1 button, the virtual character 612 is controlled by the user 102 to fire virtual bullets at the virtual character 614 to kill the virtual character 615 of the game context 622.

In addition or as an alternative to highlighting the R1 button, the assistance input data 506 includes notification data, such as screen text data, for displaying a notification 624, such as "Press R1", to motivate the user 102 to press the R1 button within the game context 622. The assistance input data 506 indicates to the processor of the HHC 104 to control the display device 602 to generate the notification 618 indicating the user 102 to press the X button. Upon receiving the assistance input data 506, the processor of the HHC 104 sends the assistance input data 506 to the GPU of the HHC 104. Upon receiving the assistance input data 506, the GPU controls the display screen of the HHC 104 to display the notification 624 on the display screen.

In addition or as an alternative to displaying the notification 624, the assistance input data 506 includes audio data for generating a sound, such as "Press R1", to motivate the user 102 to press the R1 button to interact with the game context 610. The assistance input data 506 indicates to the processor of the HHC 104 to control the speakers of the HHC 104 to generate the sound indicating the user 102 to press the R1 button. Upon receiving the assistance input data 506, the processor of the HHC 104 generates a control signal and sends the control signal to the audio drivers of the HHC 104. Upon receiving the control signal, the audio drivers output current signals to the audio drive systems. The audio drive systems generate a magnetic field to control the diaphragms of the speakers to output the sound, such as "Press R1", to motivate the user 102 to press the R1 button.

In addition or as an alternative to highlighting the R1 button and in addition to or as an alternative to displaying the notification 624 and in addition or as an alternative to outputting the sound to indicate to the user 102 to press the R1 button, the assistance input data 506 indicates to the processor of the HHC 104 to control the R1 button to automatically select, such as press, the R1 button. Upon receiving the assistance input data 506 to indicate to press the R1 button, the processor of the HHC 104 sends a control signal to the quaternary driver. Upon receiving the control signal, the quaternary driver generates a current signal and sends the current signal to the coil of the quaternary drive system. Upon receiving the current signal, the coil of quaternary drive system generates a magnetic field. The magnetic field interacts with a magnetic field of the magnet of the quaternary drive system to control, such as press, the R1 button downward towards the body 608 of the HHC 104.

It should be noted that state data generated from the current game context, such as one of the game contexts 610, 620, and 624, user interactions during the current game context, and performance metrics generated based on the user interactions with the current game context become a portion of the state data 418 (FIG. 4) to dynamically, such as constantly or continuously, update the profile model 416. For example, the metadata processor 402 parses the state data 418 to distinguish the game contexts 610, 620, and 624 from the user interactions with the game contexts 610, 620, and 624 and from the performance metrics achieved by the user interactions. The game contexts 610, 620, and 624, the user interactions with the game contexts, and the performance metrics achieved by the user interactions are then labeled by the labelers 404 through 408, and then classified by the classifiers 410 through 414 to provide classifications to the profile model 416 (FIG. 4). The profile model 416 generates additional predictive indicators to add to the predictive indicators 426 or updates the predictive indicators 426 based on the classifications and one or more of the labels.

In one embodiment, the HMD is controlled in the same manner as that of the HHC 104 based on the assistance input data 506. For example, a specific region, such as a right side of the HMD is illuminated, or a left side of the HMD is illuminated, or a top side of the HMD is illuminated, or a bottom side of the HMD is illuminated based on the assistance input data 506. In the example, the illumination of one of the four sides indicates to the user 102 to look in a direction of the one of the four sides to interact with a game context displayed on the HMD.

In an embodiment, in addition to or instead of providing feedback to the user 102 via lights, or press inputs, or notifications, or a combination thereof, haptic feedback is provided to the user 102 by providing haptic feedback data to one or more buttons of the HHC 104.

In one embodiment, although the embodiments described herein apply to one or more games, the embodiments apply equally as well to multimedia contexts of one or more interactive spaces, such as a metaverse.

Figure 7:
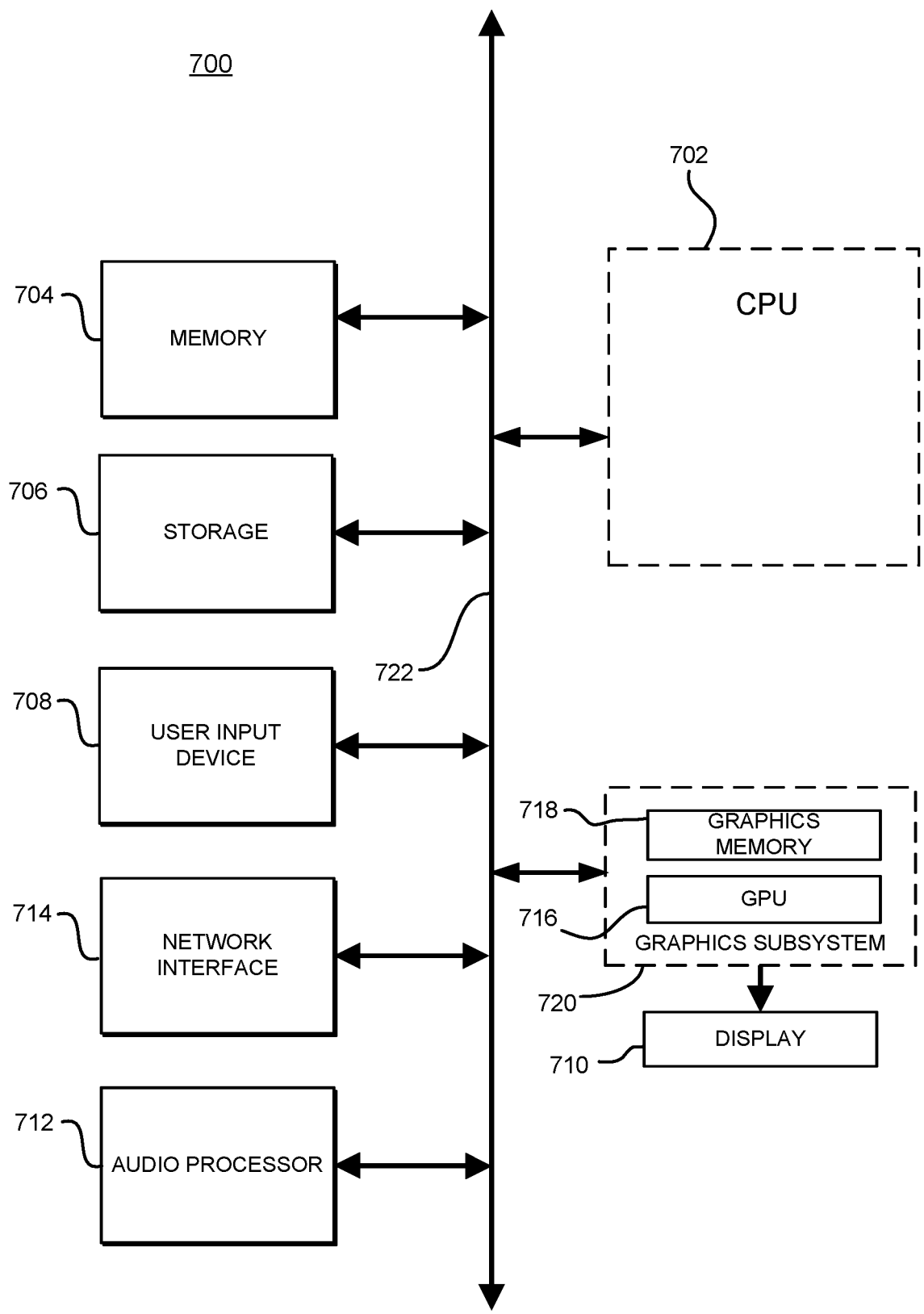
FIG. 7 illustrates components of an example device that can be used to perform aspects of the various embodiments of the present disclosure.

FIG. 7 illustrates components of an example device 700 that can be used to perform aspects of the various embodiments of the present disclosure. This block diagram illustrates the device 700 that can incorporate or can be a personal computer, video game console, personal digital assistant, a server or other digital device, suitable for practicing an embodiment of the disclosure. The device 700 includes a central processing unit (CPU) 702 for running software applications and optionally an operating system. The CPU 702 includes one or more homogeneous or heterogeneous processing cores. For example, the CPU 702 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 700 can be a localized to a player playing a game segment (e.g., game console), or remote from the player (e.g., back-end server processor), or one of many servers using virtualization in a game cloud system for remote streaming of gameplay to clients.

A memory 704 stores applications and data for use by the CPU 702. A storage 706 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 708 communicate user inputs from one or more users to the device 700. Examples of the user input devices 708 include keyboards, mouse, joysticks, touch pads, touch screens, still or video recorders/cameras, tracking devices for recognizing gestures, and/or microphones. A network interface 714 allows the device 700 to communicate with other computer systems via an electronic communications network, and may include wired or wireless communication over local area networks and wide area networks, such as the internet. An audio processor 712 is adapted to generate analog or digital audio output from instructions and/or data provided by the CPU 702, the memory 704, and/or data storage 706. The components of device 700, including the CPU 702, the memory 704, the data storage 706, the user input devices 708, the network interface 710, and an audio processor 712 are connected via a data bus 722.

A graphics subsystem 720 is further connected with the data bus 722 and the components of the device 700. The graphics subsystem 720 includes a graphics processing unit (GPU) 716 and a graphics memory 718. The graphics memory 718 includes a display memory (e.g., a frame buffer) used for storing pixel data for each pixel of an output image. The graphics memory 718 can be integrated in the same device as the GPU 716, connected as a separate device with the GPU 716, and/or implemented within the memory 704. Pixel data can be provided to the graphics memory 718 directly from the CPU 702. Alternatively, the CPU 702 provides the GPU 716 with data and/or instructions defining the desired output images, from which the GPU 716 generates the pixel data of one or more output images. The data and/or instructions defining the desired output images can be stored in the memory 704 and/or the graphics memory 718. In an embodiment, the GPU 716 includes three-dimensional (3D) rendering capabilities for generating pixel data for output images from instructions and data defining the geometry, lighting, shading, texturing, motion, and/or camera parameters for a scene. The GPU 716 can further include one or more programmable execution units capable of executing shader programs.

The graphics subsystem 714 periodically outputs pixel data for an image from the graphics memory 718 to be displayed on the display device 710. The display device 710 can be any device capable of displaying visual information in response to a signal from the device 700, including a cathode ray tube (CRT) display, a liquid crystal display (LCD), a plasma display, and an organic light emitting diode (OLED) display. The device 700 can provide the display device 710 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for providing assistance to a hand-held controller operated by a user during gameplay, comprising:
   accessing an artificial intelligence model via a user account of the user, wherein the artificial intelligence model is used to generate one or more predictive indicators based on a plurality of game contexts during a plurality of game sessions of one or more games, wherein the one or more predictive indicators identify that the user will be unable to complete a task during a game;
   receiving a request for accessing the game for a game session via the user account;
   determining that the game session includes a game context similar to one or more of the plurality of game contexts; and
   providing assistance input via a computer network to the hand-held controller operated by the user during the game context responsive to the one or more predictive indicators identifying that the user will be unable to complete the task in the game context, wherein the assistance input is provided before the user performs the task.

2. The method of claim 1, wherein the artificial intelligence model includes a neural network that is trained by one or more gameplays occurring via the user account, the one or more gameplays used to perform labeling and classification of the plurality of game contexts, labeling and classification of a plurality of user interactions, and labeling and classification of a plurality of performance metrics.

3. The method of claim 2, further comprising:
   generating state data for the one or more gameplays; and
   parsing the state data to identify the plurality of game contexts of the one or more games, the plurality of user interactions with the plurality of game contexts, and the plurality of performance metrics that are generated based on the plurality of user interactions and the plurality of game contexts.

4. The method of claim 3, further comprising:
   labeling the plurality of game contexts to identify the plurality of game contexts;
   labeling the plurality of user interactions to identify the plurality of user interactions;

labeling the plurality of performance metrics to identify the plurality of performance metrics;
classifying the plurality of game contexts to provide a level to each of the plurality of game contexts;
classifying the plurality of user interactions to provide a level to each of the plurality of user interactions; and
classifying the plurality of performance metrics to provide a level to each of the plurality of performance metrics.

5. The method of claim 4, wherein the one or more predictive indicators are determined based on the levels of the plurality of game contexts, the levels of the plurality of user interactions, and the levels of the plurality of performance metrics, a number of occurrences of the levels of the plurality of game contexts, a number of occurrences of the levels of the plurality of user interactions, and a number of occurrences of the levels of the plurality of performance metrics.

6. The method of claim 1, wherein said providing the assistance input occurs upon determining that the game context of the game session is similar to one or more of the plurality of game contexts used to train the artificial intelligence model.

7. The method of claim 1, wherein the assistance input includes controller input data, light data for controlling one or more lights on the hand-held controller, screen text data for presenting on a display device used during the game session, and audio data for outputting sounds during the game session.

8. A computer system for providing assistance during gameplay, comprising:
a processor configured to:
access an artificial intelligence model via a user account of a user, wherein the artificial intelligence model is used to generate one or more predictive indicators based on a plurality of game contexts during a plurality of game sessions of one or more games, wherein the one or more predictive indicators identify that the user will be unable to complete a task during a game;
receive a request for accessing the game for a game session via the user account;
determine that the game session includes a game context similar to one or more of the plurality of game contexts;
provide assistance input via a computer network to a hand-held controller operated by the user during the game context responsive to the one or more predictive indicators identifying that the user will be unable to complete the task in the game context; and
provide the assistance input before the user performs the task;
and a memory device coupled to the processor.

9. The computer system of claim 8, wherein the artificial intelligence model includes a neural network that is trained by one or more gameplays occurring via the user account, the one or more gameplays used to perform labeling and classification of the plurality of game contexts, labeling and classification of a plurality of user interactions, and labeling and classification of a plurality of performance metrics.

10. The computer system of claim 9, wherein the processor is configured to:
generate state data for the one or more gameplays; and
parse the state data to identify the plurality of game contexts of the one or more games, the plurality of user interactions with the plurality of game contexts, and the plurality of performance metrics that are generated based on the plurality of user interactions and the plurality of game contexts.

11. The computer system of claim 10, wherein the processor is configured to:
label the plurality of game contexts to identify the plurality of game contexts;
label the plurality of user interactions by the user to identify the plurality of user interactions;
label the plurality of performance metrics to identify the plurality of performance metrics;
classify the plurality of game contexts to provide a level to each of the plurality of game contexts;
classify the plurality of user interactions to provide a level to each of the plurality of user interactions; and
classify the plurality of performance metrics to provide a level to each of the plurality of performance metrics.

12. The computer system of claim 11, wherein the one or more predictive indicators are determined based on the levels of the plurality of game contexts, the levels of the plurality of user interactions, and the levels of the plurality of performance metrics, a number of occurrences of the levels of the plurality of game contexts, a number of occurrences of the levels of the plurality of user interactions, and a number of occurrences of the levels of the plurality of performance metrics.

13. The computer system of claim 8, wherein the assistance input is provided when the artificial intelligence model determines that the game context of the game session is similar to one of the plurality of game contexts used to train the artificial intelligence model.

14. The computer system of claim 8, wherein the assistance input includes controller input data, light data for controlling one or more lights on the hand-held controller, screen text data for presenting on a display device used during the game session, and audio data for outputting sounds during the game session.

15. A system for providing assistance during gameplay, comprising:
a client device operated by a user during gameplay; and
a server coupled to the client device via a computer network, wherein the server is configured to:
access an artificial intelligence model via a user account of a user, wherein the artificial intelligence model is used to generate one or more predictive indicators based on a plurality of game contexts during a plurality of game sessions of one or more games, wherein the one or more predictive indicators identify that the user will be unable to complete a task during a game;
receive a request for accessing the game for a game session via the user account;
determine that the game session includes a game context similar to one or more of the plurality of game contexts;
provide assistance input via the computer network to the client device operated by the user during the game context responsive to the one or more predictive indicators identifying that the user will be unable to complete the task in the game context; and send the assistance input before the user performs the task, wherein the client device is configured to receive the assistance input from the server via the computer network.

16. The system of claim 15, wherein the assistance input is provided when the artificial intelligence model determines that the game context of the game session is similar to one of the plurality of game contexts used to train the artificial intelligence model.

17. The system of claim 15, wherein the artificial intelligence model includes a neural network that is trained by one or more gameplays occurring via the user account, the one or more gameplays used to perform labeling and classification of the plurality of game contexts, labeling and classification of a plurality of user interactions, and labeling and classification of a plurality of performance metrics.

18. The system of claim 17, wherein the server is configured to:
generate state data for the one or more gameplays; and
parse the state data to identify the plurality of game contexts of the one or more games, the plurality of user interactions with the plurality of game contexts, and the plurality of performance metrics that are generated based on the plurality of user interactions and the plurality of game contexts.

19. The system of claim 17, wherein the server is configured to:
label the plurality of game contexts to identify the plurality of game contexts;
label the plurality of user interactions with the plurality of game contexts to identify the plurality of user interactions;
label the plurality of performance metrics achieved based on the plurality of user interactions to identify the plurality of performance metrics;
classify the plurality of game contexts to provide a level to each of the plurality of game contexts;
classify the plurality of user interactions to provide a level to each of the plurality of user interactions; and
classify the plurality of performance metrics to provide a level to each of the plurality of performance metrics,
wherein the one or more predictive indicators are determined based on the levels of the plurality of game contexts, the levels of the plurality of user interactions, and the levels of the plurality of performance metrics, a number of occurrences of the levels of the plurality of game contexts, a number of occurrences of the levels of the plurality of user interactions, and a number of occurrences of the levels of the plurality of performance metrics.

20. The system of claim 15, wherein the client device is a hand-held controller or a head-mounted display.

* * * * *